(12) United States Patent
Hermanson

(10) Patent No.: US 7,127,926 B1
(45) Date of Patent: *Oct. 31, 2006

(54) CIRCULAR AND OVAL FLANGED RINGS FOR DUCTING AND METHOD OF MAKING

(76) Inventor: J. A. Hermanson, 2827 Deer Island Dr. East, Sumner, WA (US) 98390

( * ) Notice: Subject to any disclaimer, the term of this patent is extended or adjusted under 35 U.S.C. 154(b) by 645 days.

This patent is subject to a terminal disclaimer.

(21) Appl. No.: 09/956,745

(22) Filed: Sep. 17, 2001

Related U.S. Application Data

(63) Continuation of application No. 09/484,741, filed on Jan. 18, 2000, now Pat. No. 6,289,706, which is a continuation-in-part of application No. 09/441,037, filed on Nov. 16, 1999, now Pat. No. 6,301,781, which is a continuation-in-part of application No. 08/616,655, filed on Mar. 15, 1996, now Pat. No. 5,983,496.

(51) Int. Cl.
*B21D 22/00* (2006.01)

(52) U.S. Cl. ................................ 72/85; 72/82; 72/176; 72/178; 29/890.15

(58) Field of Classification Search .................. 72/82, 72/83, 84, 85, 176, 178; 29/890.14, 890.15
See application file for complete search history.

(56) References Cited

U.S. PATENT DOCUMENTS

| | | | | |
|---|---|---|---|---|
| 5,809,649 A | * | 9/1998 | Kostermeier | 329/893.32 |
| 5,983,496 A | * | 11/1999 | Hermanson | 29/890.15 |
| 6,289,706 B1 | * | 9/2001 | Hermanson | 72/82 |

* cited by examiner

*Primary Examiner*—Ed Tolan
(74) *Attorney, Agent, or Firm*—Christensen O'Connor Johnson Kindness pllc

(57) ABSTRACT

A method of making Circular and Oval Flanged Rings, for the connection of thin walled circular and oval ducting, including Circular and Oval Flanged Rings having a Sheet Metal and Air Conditioning Contractors National Association (SMACNA) standard T24 Profile. Thin gauge Lock Form Quality steel, from 10 to 20 gauge, is cut into strips with the strip ends butt welded forming Flanged Ring Band Stock which is inserted and clamped into a Spinning Die. The Spinning Die is rotated by a horizontally configured lathe output shaft presenting the extended portion of the Flanged Ring Band Stock for machine tool forming. Standard machine tools are used to form the Flanged Ring Band Stock into a Circular Flanged Ring including the SMACNA T24 Flanged Ring Profile. A Circular Flanged Ring is cut along a diameter into Semi-circular Flanged Ring Portions; straight segments including segments with SMACNA T24 Linear Segments are roll formed, assembled into a oval shape within a fixture and welded forming the Oval Flanged Ring. The method of making and the Circular and Oval Flanged Rings are disclosed.

19 Claims, 27 Drawing Sheets

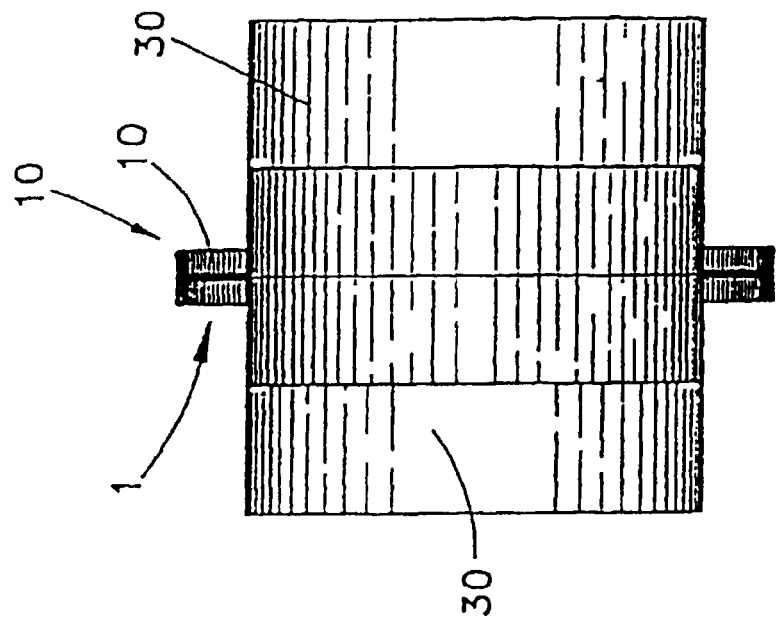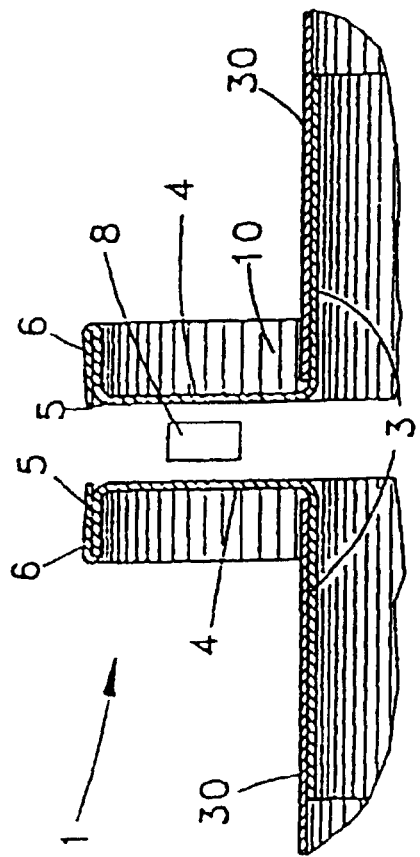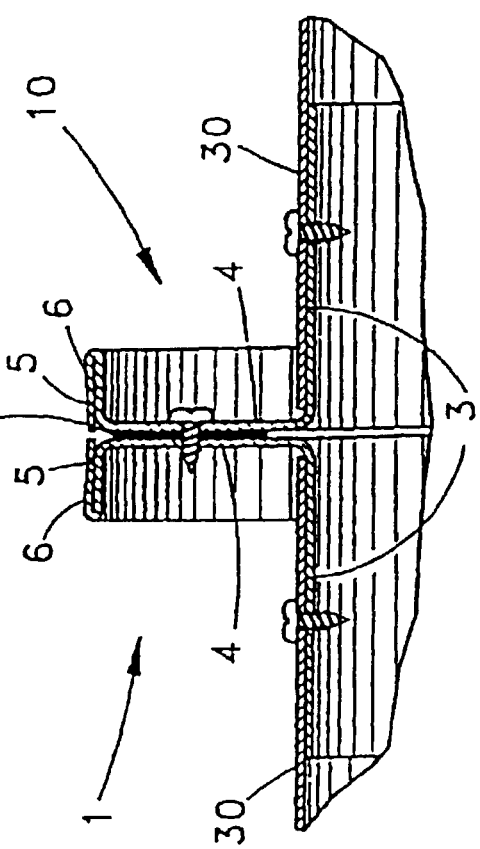

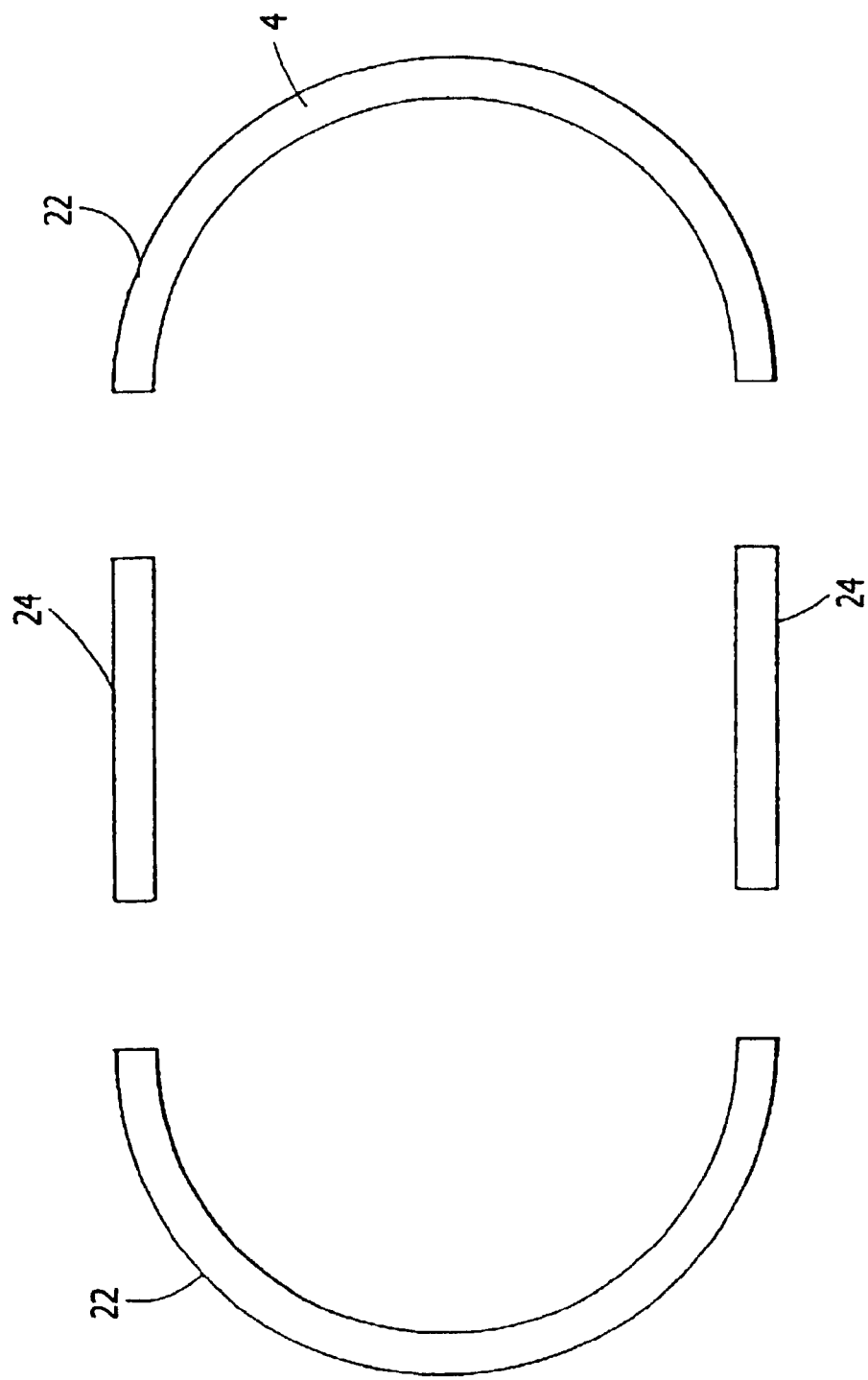

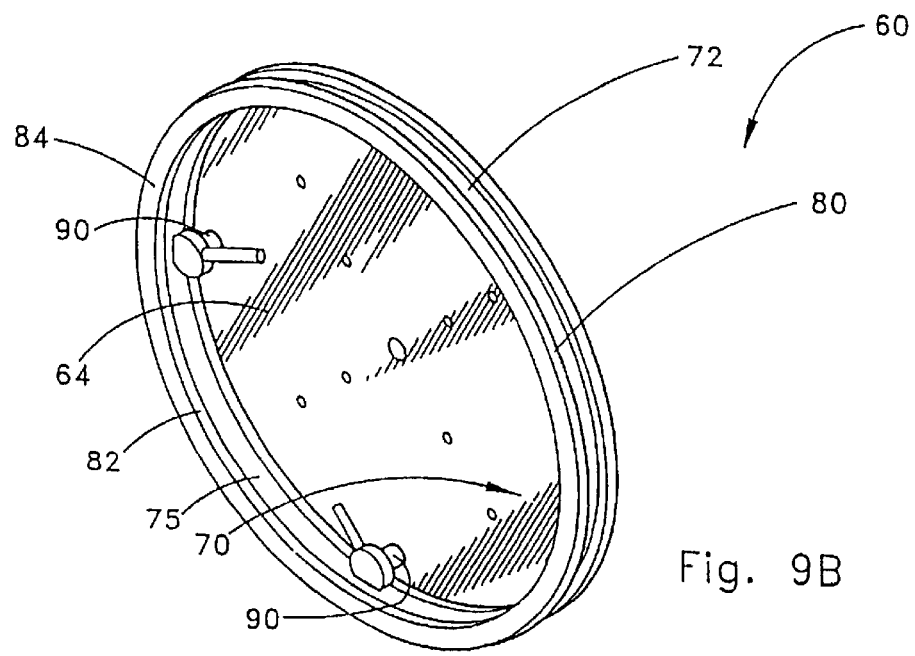
Fig. 9B
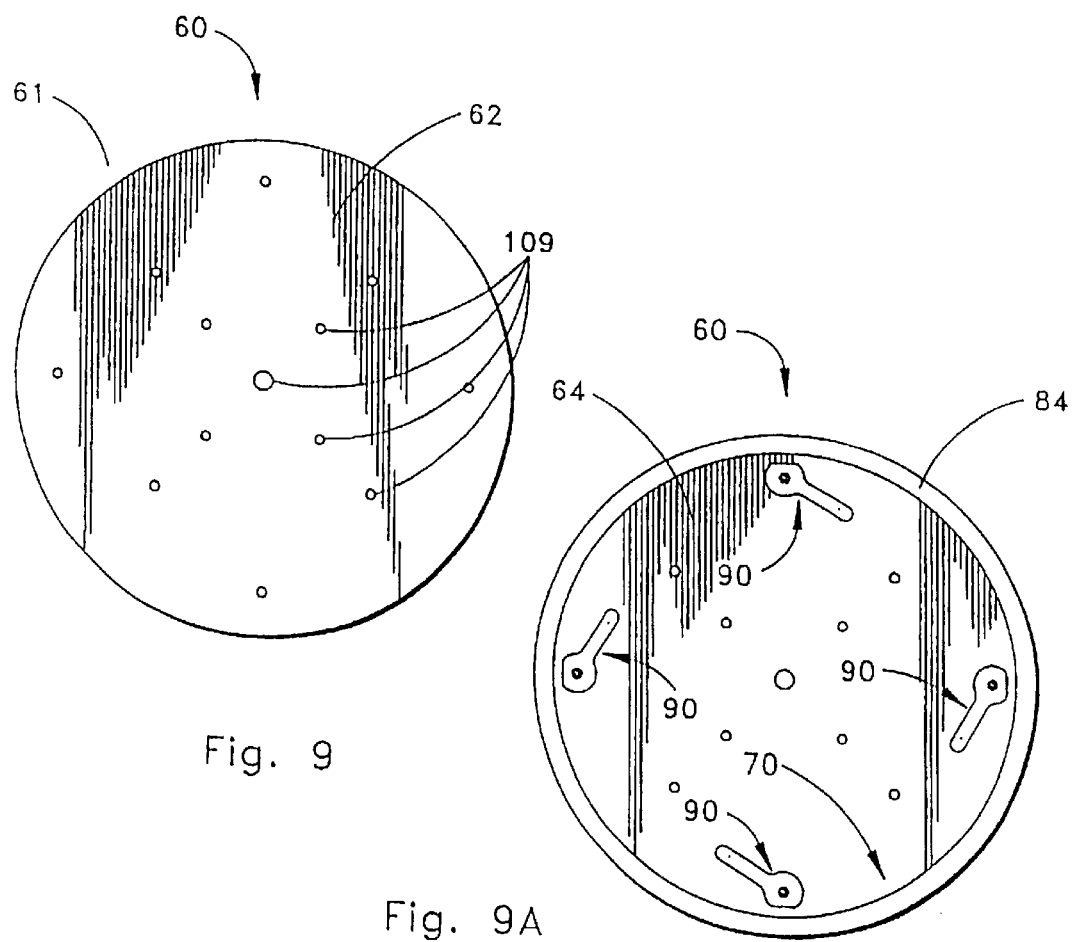
Fig. 9
Fig. 9A

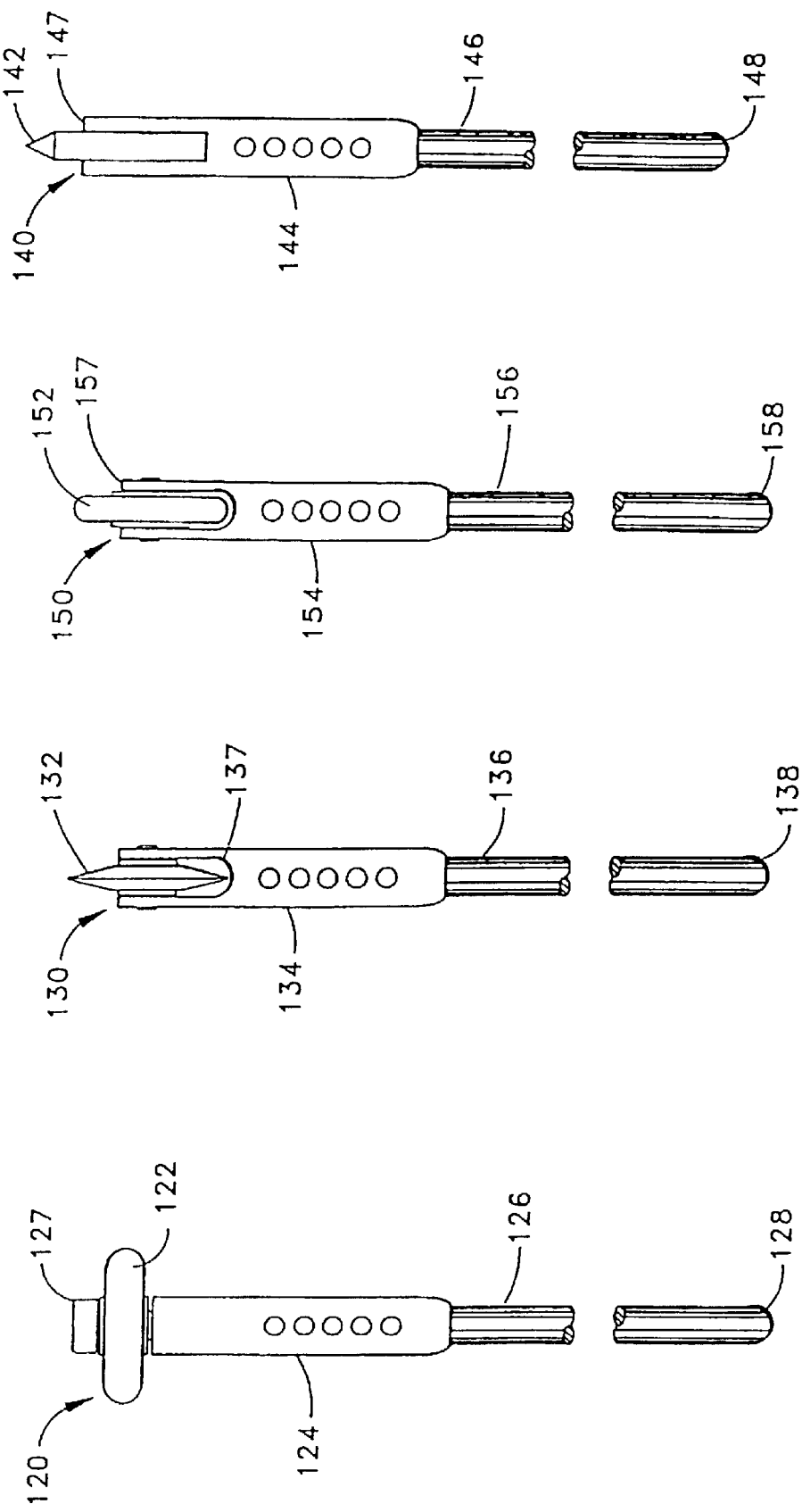

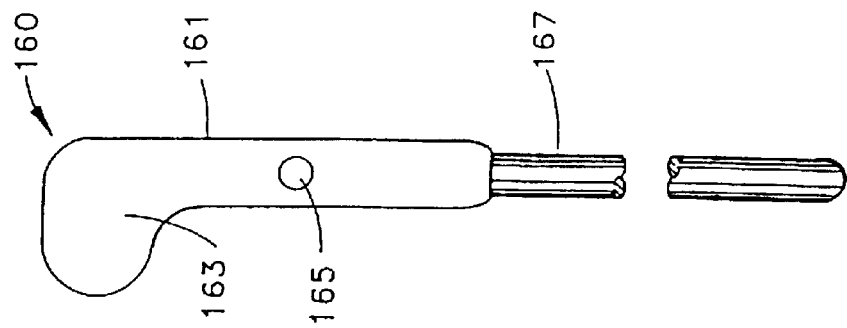
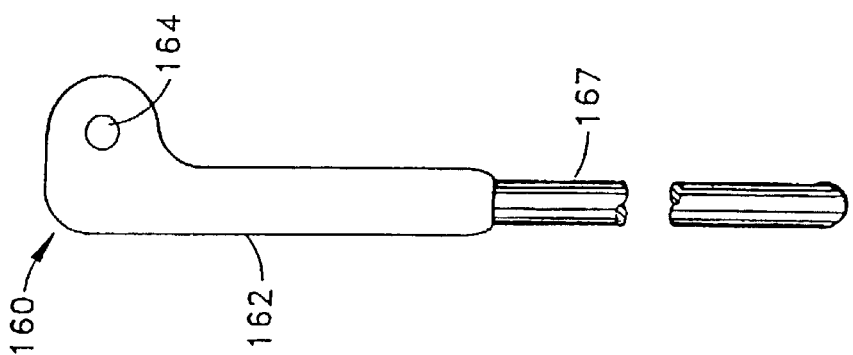
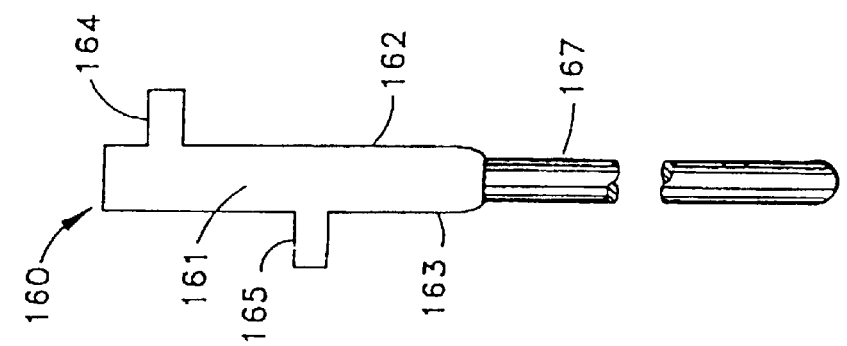

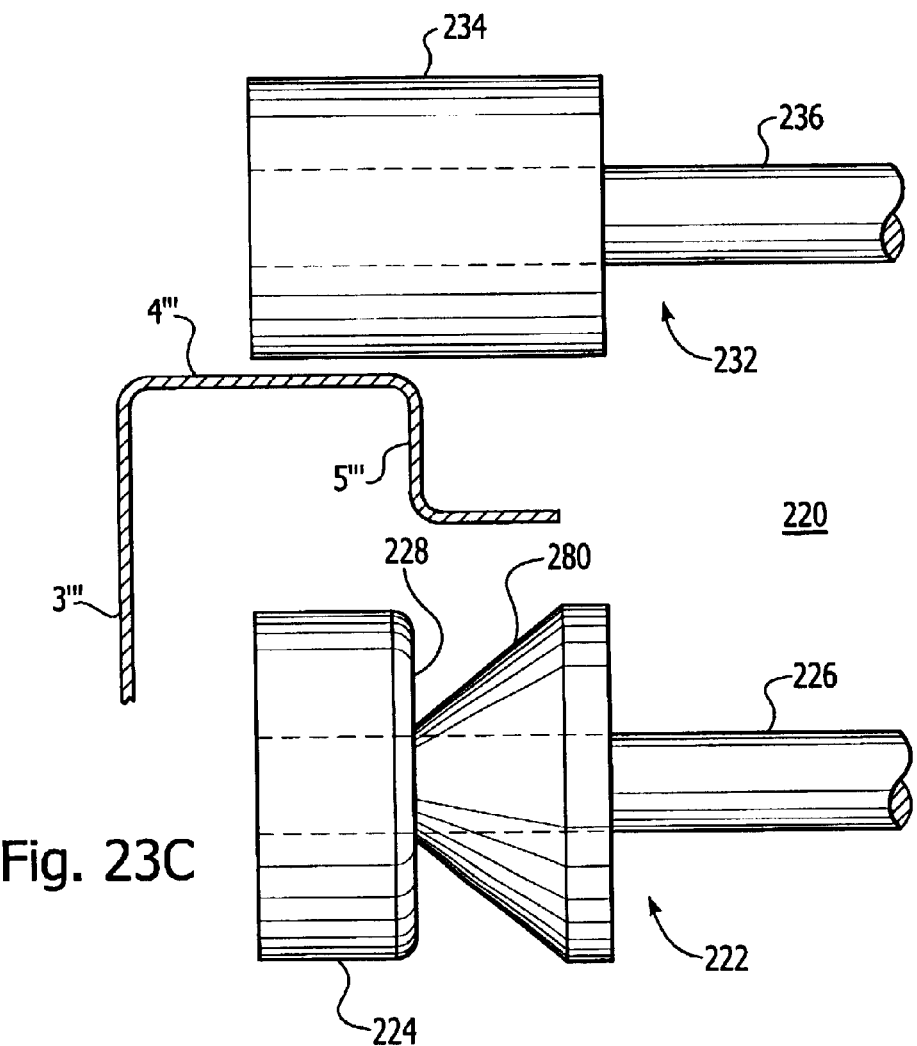
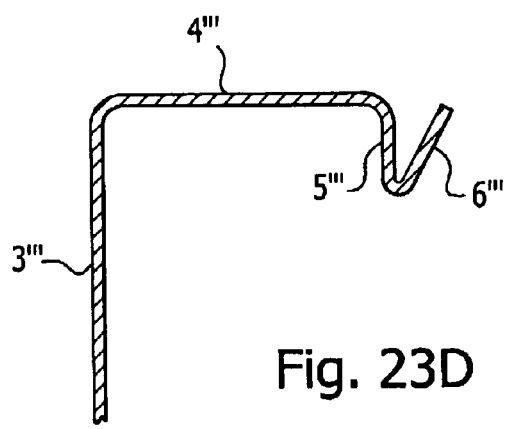
Fig. 23C
Fig. 23D

US 7,127,926 B1

CIRCULAR AND OVAL FLANGED RINGS FOR DUCTING AND METHOD OF MAKING

CROSS-REFERENCES TO RELATED APPLICATIONS

This application is a continuation of prior application Ser. No. 09/484,741, filed Jan. 18, 2000, to be issued Sep. 18, 2001 as U.S. Pat. No. 6,289,706, which is a continuation-in-part of U.S. application Ser. No. 09/441,037 filed Nov. 16, 1999, now U.S. Pat. No. 6,301,781 which is a continuation-in-part of U.S. application Ser. No. 08/616,655, filed Mar. 15, 1996 and now U.S. Pat. No. 5,983,496.

FIELD OF THE INVENTION

The present invention relates to Circular and Oval Flanged Rings for connecting oval and circular heating, ventilation and air conditioning (HVAC) ducting sections, from thin gauge Lock Form Quality steel, and a method for spin-forming such Flanged Rings.

BACKGROUND OF THE INVENTION

Joint assemblies are well known for the connection of the ends of adjacent rectangular, circular and oval HVAC duct sections. U.S. Pat. No. 5,129,690 to Meinig recites prior art relating to such assemblies and discloses an apparatus for connecting the ends of oval duct sections without disclosure of the method of making the apparatus; the patent does refer to U.S. Pat. No. 4,516,797 to Meinig which discloses a one-piece flanged ring for connecting the ends of circular duct sections. U.S. Pat. No. 4,516,797 discloses a method for producing the flanged ring by contouring and then bending an elongated sheet-metal strip into an annular shape resulting in a flanged ring having an axial slit and claiming a method for producing a flanged ring characterized as an elongated sheet metal strip which is contoured and subsequently bent into annular form.

The machine method used to produce such a flanged ring is known to include roll forming. However, roll forming is limited generally to sheet-metal less than 10 gauge with roll forming causing tearing or breaking of sheet-metal in the production of flanged rings from thinner sheet-metal of gauge 10 or greater. Circular flanged rings, produced by roll forming, and thin-walled sheet-metal ducting generally do not have an absolutely circular cross section. The predominate means of manufacturing HVAC ducting is in the form of spiral seam tubes made up of helical wound sheet-metal strips with the strips interconnected by means of lock seams. The lock seams stand out from the outer duct face.

U.S. Pat. Nos. 4,516,797 and 5,129,690 to Meinig are identified and disclosed in accordance with 37 CFR 1.97.

SUMMARY OF THE INVENTION

An object of this invention is to make, by spinning, forming and trimming, with standard machine tools and machining processes, Circular and Oval Flanged Rings from Lock Form Quality steel of gauge 10 to 20, for the connection of the ends of thin-walled circular and oval sheet-metal tubes or ducting. The present invention is capable of making Flanged Rings that comply to the T24 flange profile of the Sheet Metal and Air-Conditioning Contractors National Association (SMACNA). The method requires LFQ steel strips to be rolled into Flanged Ring Band Stock Strips having Strip First and Second Ends which are butt welded together with a tungsten inert gas process with no filler. A Spinning Die, which is balanced and which has structure means or supporting structural member means, receives the Flanged Ring Band Stock which is secured within the Spinning Die by appropriate means, for example by clamp means. The Spinning Die is rotated by means, for example by a lathe, and standard machine tools are employed to stretch, form and trim the Flanged Ring Band Stock to produce a Circular Flanged Ring for the connection of circular and oval thin gauged pipe or ducting sections.

The preferred embodiment of flanged ring profile described herein constitutes the Sheet Metal and Air-Conditioning Contractors National Association (SMACNA) standard T24 Flange Profile. The profile disclosed is not limited to the SMACNA T24 profile. However, the method disclosed produces Circular or Oval Flanged Rings while the SMACNA T24 Flange Profile references solely to flanges for the connection of rectangular ducting sections. This disclosure is the only known method of producing the SMACNA T24 Flange Profile for Circular and Oval Flanged Rings from 10 or greater gauge LFQ steel. The SMACNA T24 Flange Profile or cross section produced by the method described has an Insertion Flange portion which is secured within the Spinning Die by means including clamp means, a Mating Flange portion which is stretched and formed and which meets and matches an opposing mating flange portion, a Hem portion which is formed and a Return Flange.

The Oval Flanged Ring is produced by cutting a Circular Flanged Ring along a diameter to produce approximately equal sized semi-circular Flanged Ring Portions. Equal length SMACNA T24 Linear Segments of the SMACNA T24 Flange Profile are produced, for instance by roll forming, and are welded to the Semi-circular Flanged Ring Portions to produce the Oval Flanged Ring.

The preferred embodiment of the present disclosed method results in the production of the SMACNA T24 Flange Profile from 10 to 20 gauge Lock Form Quality steel (under 30,000 psi yield/tensile, galvanized G60; however, any metal which can be turned in the following described process and which can be welded may be used for production). The preferred embodiment of the described method requires the preparation of Flanged Ring Band Stock from 3.87511 wide 10 to 20 gauge LFQ steel. The material and material width may be varied as preferred.

An additional object of this invention is the formation of a Circular Flanged Ring which is more nearly circular in cross section than flanges produced by other means. The truer circular cross section facilitates the insertion of the Circular Flanged Ring in the spiral-seam tubes comprising most circular and oval HVAC ducting. The method disclosed of making the Circular Flanged Ring enables the use of much thinner gauge steel for the connection of duct section ends and in creating an airtight connection between duct section ends. The Circular Flanged Ring, produced by a spinning process, is more uniformly circular in cross section than are flanges produced from a roll forming or press operation and more readily sealed, without elaborate gaskets.

In a further aspect of the present invention, the Flange Ring is made in a two-step process with the mating flange portion being spin formed. The hem section and/or the return flange are separately formed and then butt-welded or otherwise attached to the outer perimeter of the mating flange. In another aspect of the present invention, the Flanged Ring can be manufactured by forming the insertion flange as a singular component and then forming the mating flange, hem section and return flange as the second component, perhaps by roll forming or stamping. The two components can be assembled by welding the inside perimeter of the mating flange to the end edge of the insertion flange.

As a further aspect of the present invention, the Flanged Ring can be manufactured by spin forming the mating flange in the manner described above. Thereafter, the hem section can be formed by a roll forming method using roll forming dies. If a return flange is utilized, the hem section and return flange can both be formed from the material stock extending beyond the outer perimeter of the mating flange, through the use of a series of roller sets.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a detail showing a cross section of the interrelationship of the Circular Flanged Ring inserted into ducting, of the Mating Flanges of opposing Circular Flanged Rings meeting in preparation for connection with Sealant depicted between the Mating Flanges.

FIG. 3 depicts circular Flanged Rings inserted into ducting, of the Mating Flanges of opposing Circular Flanged Rings meeting in preparation for connection.

FIG. 4 is a detail cross section depicting the connection of the Circular Flanged Ring from insertion flange to ducting and between Mating Flanges by screw means where Sealant is spread between the Mating Flanges.

FIG. 5 is an elevation view of a Circular Flanged Ring, as depicted in FIG. 1 and 3, cut along a common diameter in preparation for insertion of SMACNA T24 Linear Segments with the T24 cross section as a step in producing the T24 cross section Oval Flanged Ring.

FIG. 9 is an elevation view of the Mounting Surface of a Spinning Die.

FIG. 9A is an elevation view of the Working Surface of a Spinning Die showing the Collar, clamp means and threaded means for mounting purposes.

FIG. 9B is a perspective view of the Spinning Die.

FIG. 12 is a depiction of an Internal Roller machine tool with the Internal Roller Wheel having ideally about a 1/2l1 radius configured at 90 degrees to an axis through the Internal Roller Handle First to Second End.

FIG. 13 is a depiction of a Radius Roller with the Radius Roller Wheel having ideally about a 1/8l1 radius configured in line with an axis through the Radius Roller Handle First to Second End.

FIG. 14 is a depiction of a Finishing Roller with the Finishing Roller Wheel having ideally about a 1/2l1 radius configured in line with an axis through the Finishing Roller Handle First to Second End.

FIG. 15 is a depiction of a Trim Lever which provides ideally about a 1/2l1 square ×3 1/2l1 carbide insert Cutting Tip configured in line with an axis through the Trim Lever Handle First to Second End.

FIG. 16 is a side view of a Power Lever from which all other machine tools employed herein are operated to obtain leverage for the stretching, forming and trimming operations. Top Surface and Bottom Surface Pins are depicted.

FIG. 16A is a plan view showing the Power Lever Head and Power Lever Top Surface Pin.

FIG. 16B is a bottom view showing the Power Lever Head and Power Lever Bottom Surface Pin.

FIGS. 23A, 23B, 23C, 23D, 23E, and 23F illustrate an alternative method of forming the present invention.

DETAILED DESCRIPTION OF THE PREFERRED EMBODIMENT

The disclosure of the present invention is the Flanged Ring profile 1 for Circular and Oval Flanged Rings 10, 20, as depicted in FIGS. 1, 1A, 2, 3, 4, and 5A and the method for the production of such circular and Oval Flanged Rings. These Flanged Rings may conform to the SMACNA T24 profile. The method of production is depicted in FIGS. 6 through 19A. FIGS. 2, 3, and 4 show the Circular and Oval Flanged Rings 10, 20 in relationship to Ducting 30 and the connection of opposing Circular Flanged Rings 10. Other profiles may be produced by this method.

Figure 10:
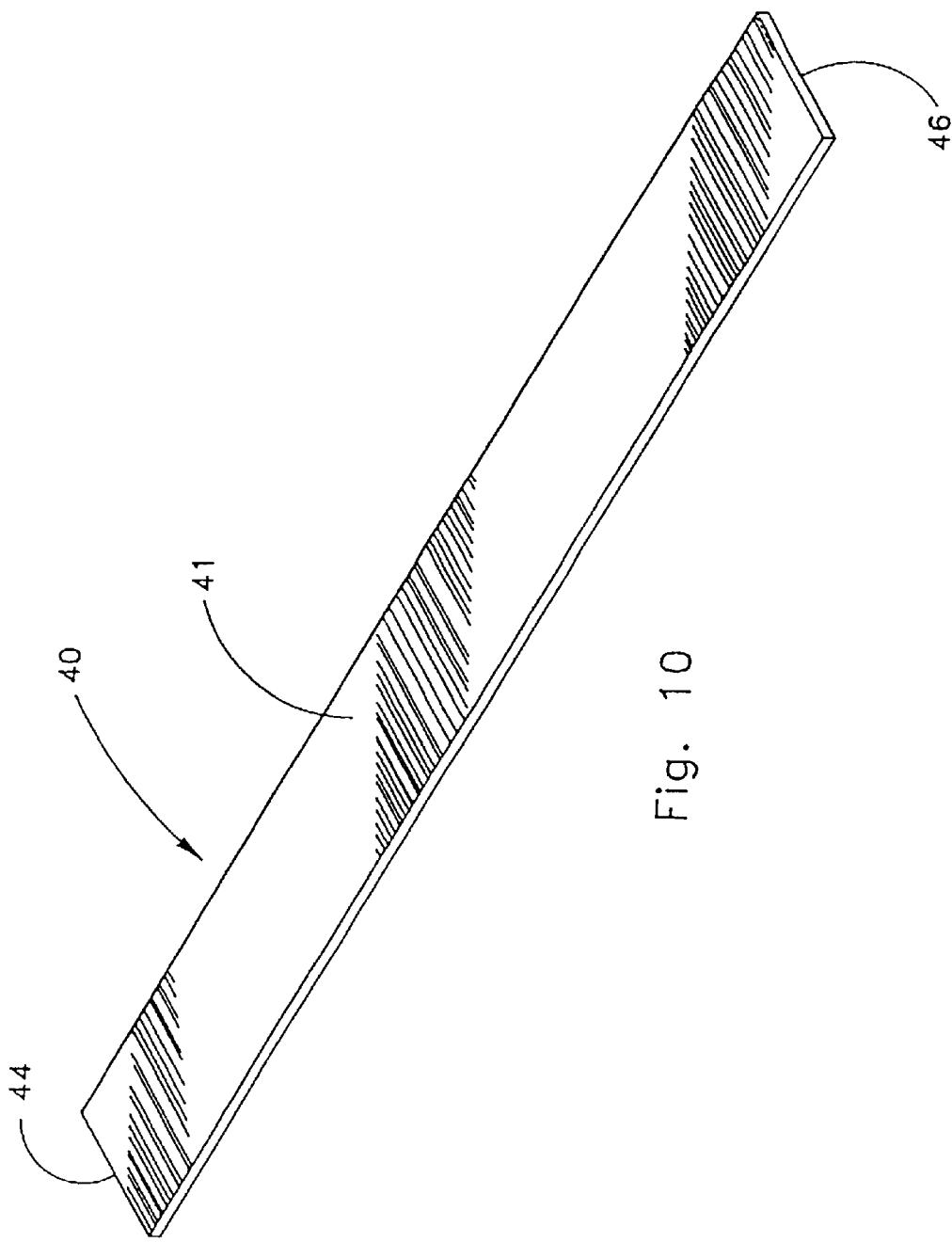
FIG. 10 is a perspective view of a Flanged Ring Band Stock Strip of LFQ steel cut to length in preparation for rolling into a band or circular form.
Figure 10B:
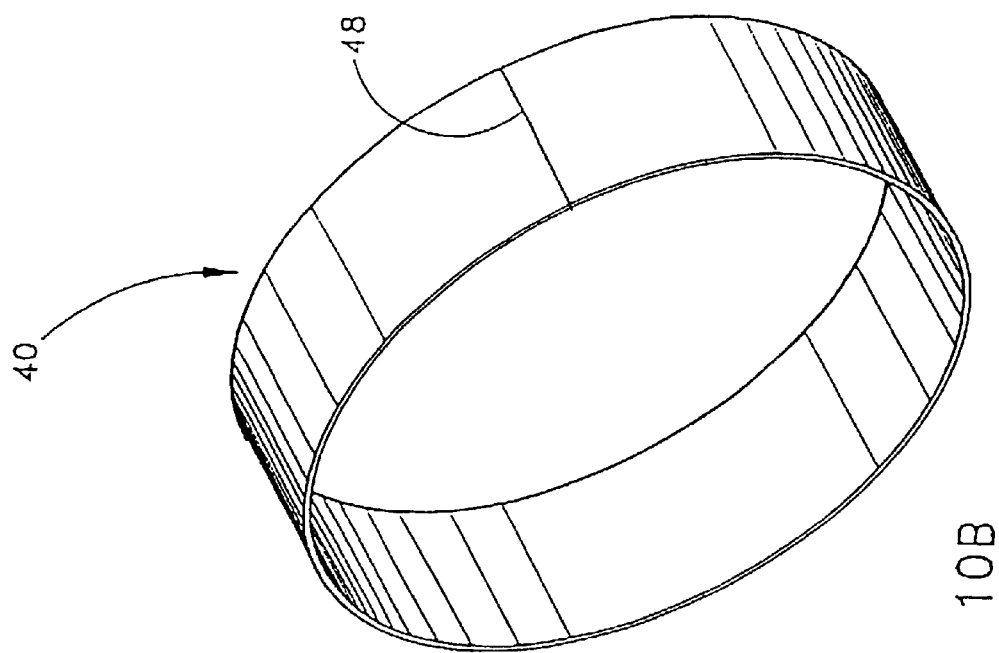
FIG. 10B is a perspective view of a Flanged Ring Band Stock which has been butt welded and is ready for insertion into a Spinning Die in preparation for spinning, stretching, forming and trimming into a Circular or Oval Flanged Ring.
Figure 10A:
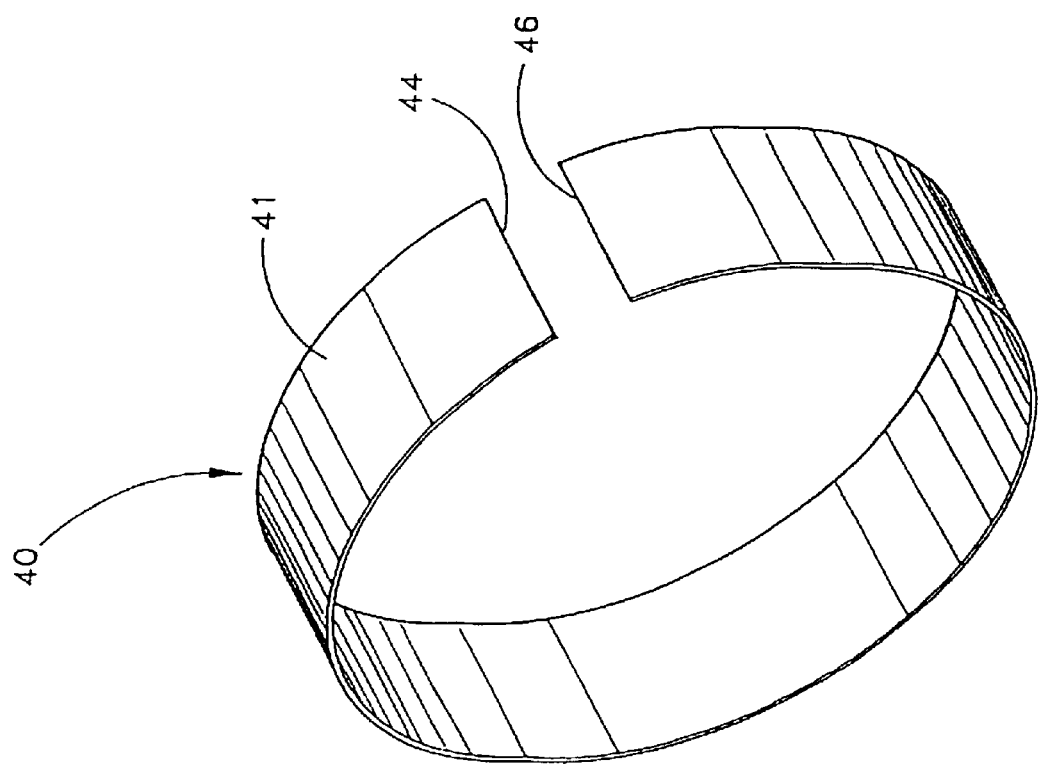
FIG. 10A is a perspective view of a rolled strip of LFQ steel formed into a band shape with Strip First and Second Ends ready to be butt welded together.
Figure 11:
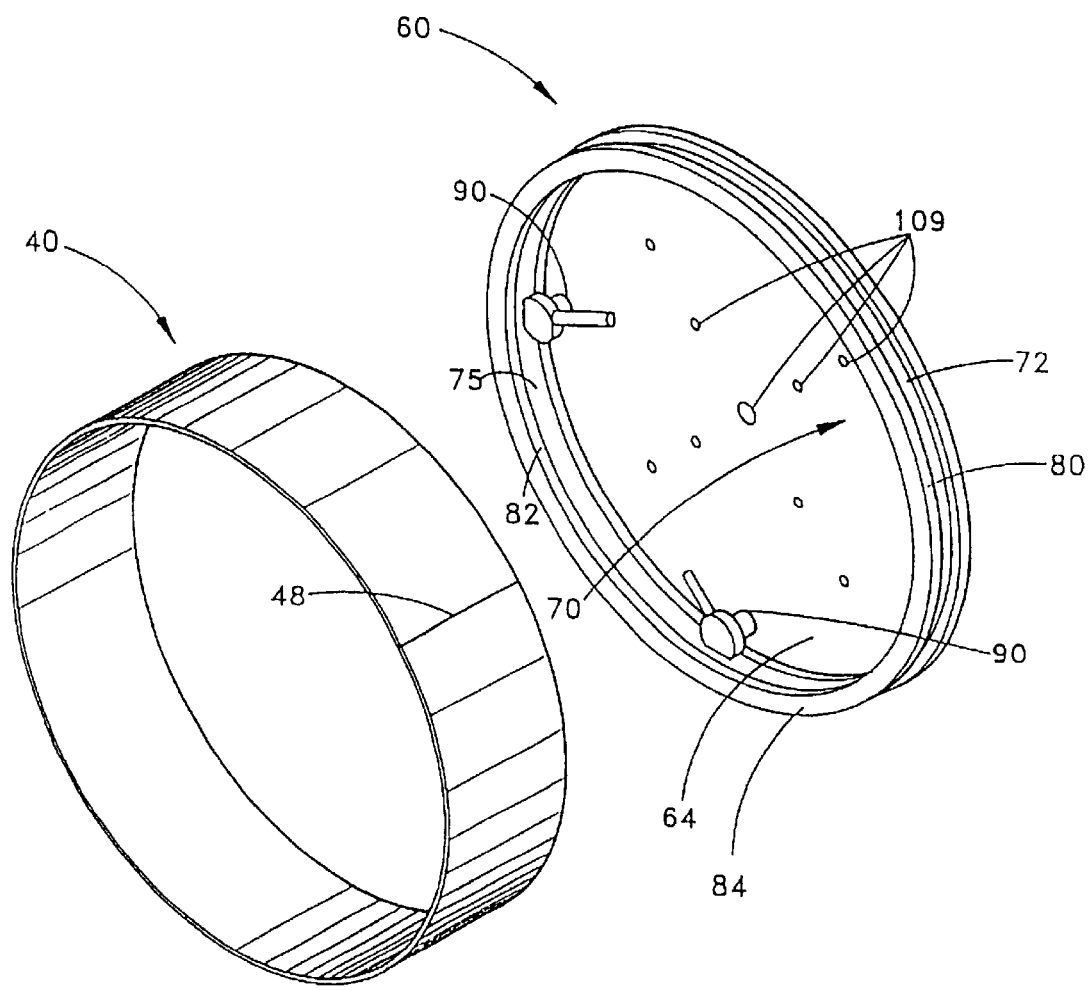
FIG. 11 is a perspective showing the Flanged Ring Band Stock and the Spinning Die.
Figure 11A:
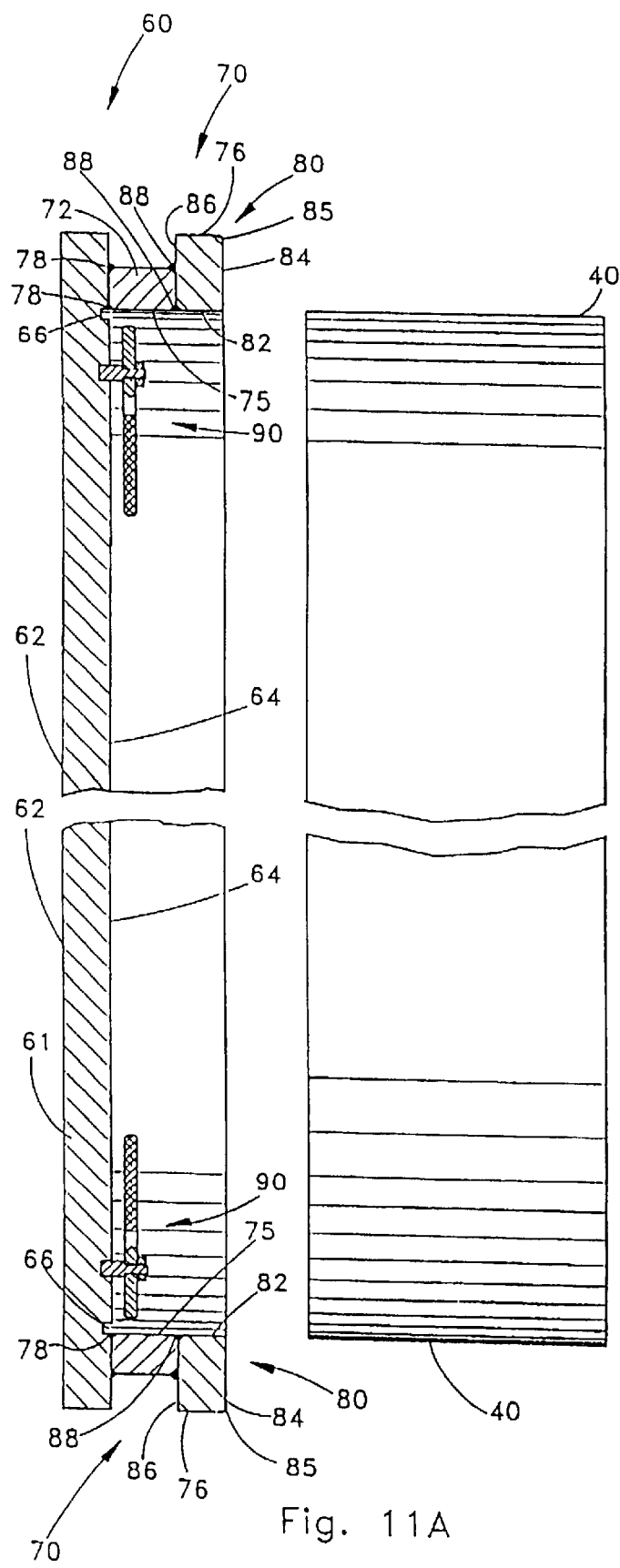
FIG. 11A is a side view of a Flanged Ring Band Stock prepared to be inserted and secured in a Spinning Die.
Figure 11B:
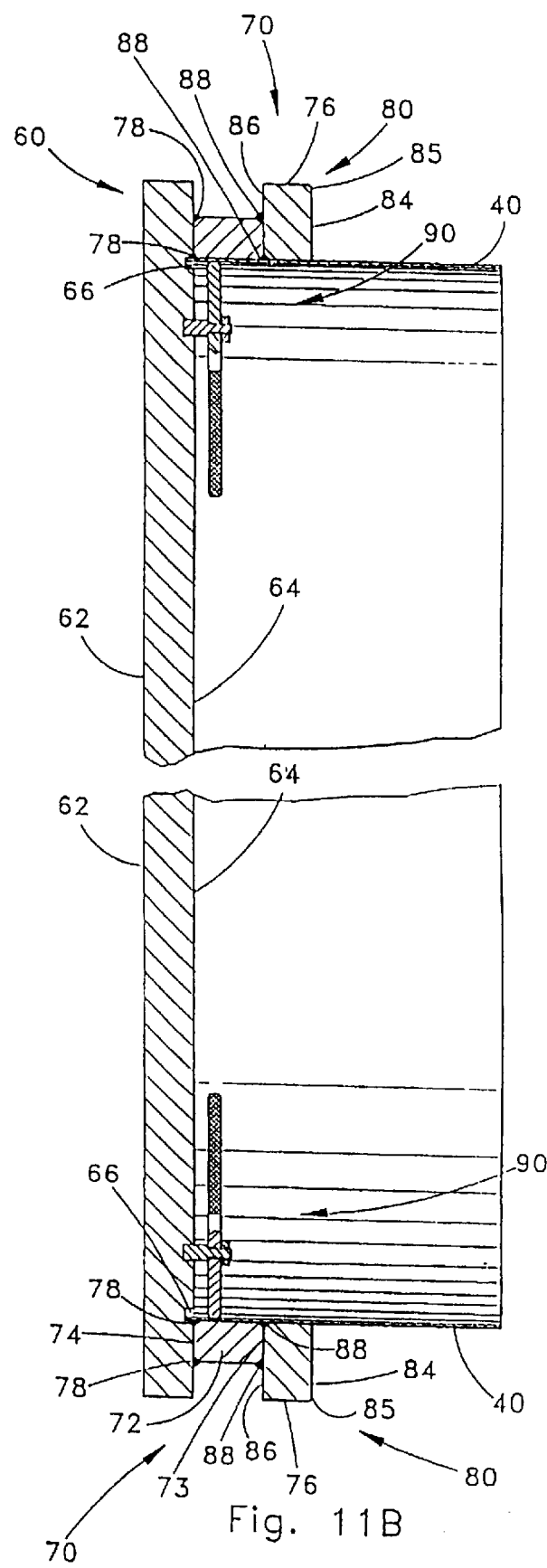
FIGURE 11B is a side view of a Flanged Ring Band Stock in the inserted position within a Spinning Die in preparation for machining steps directed to the production of a Circular Flanged Ring.
Figure 11C:
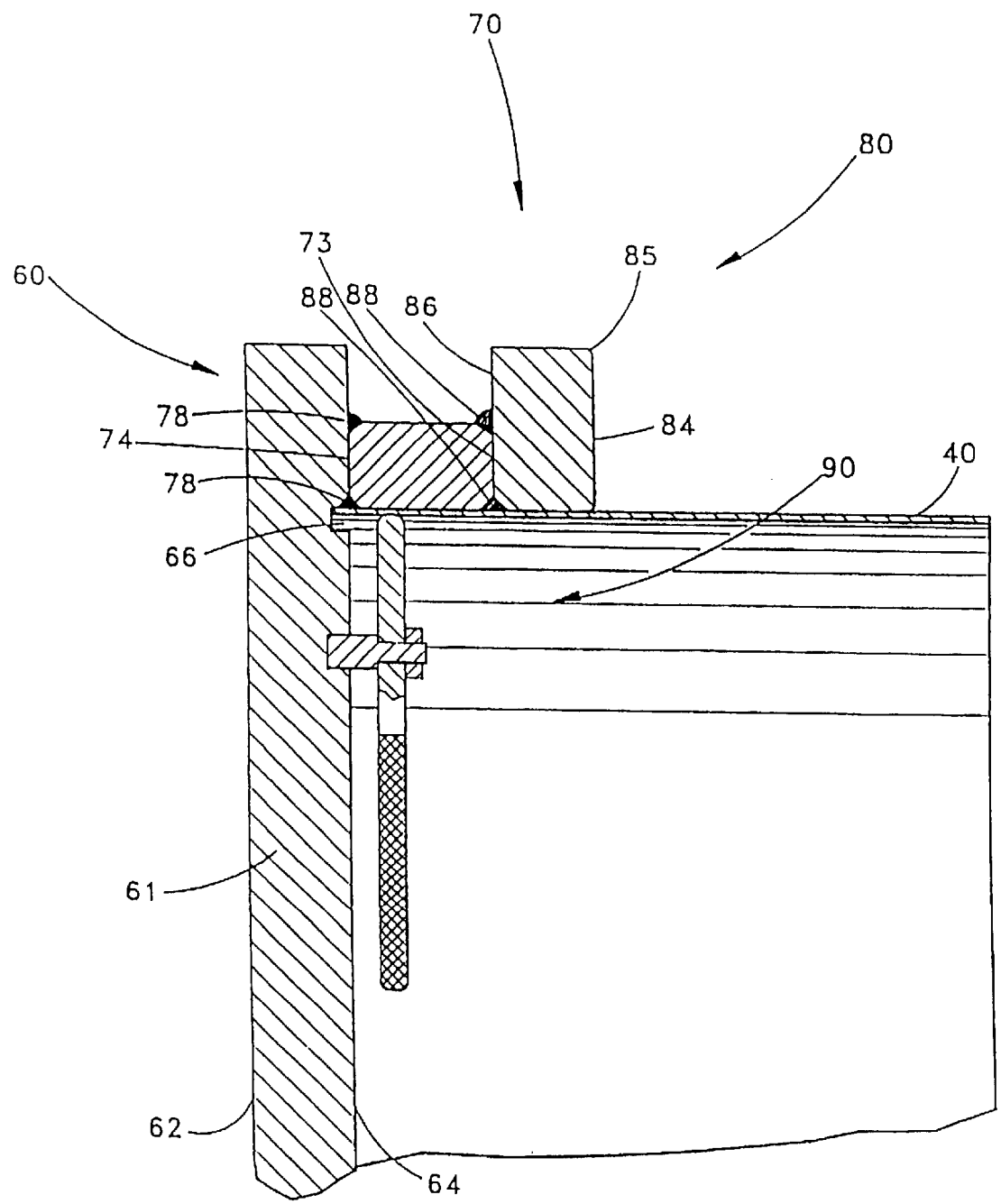
FIGURE 11C is a detail view showing a portion of the Spinning Die including the Collar and Collar components (Collar Strip and Mating Strip), a Flanged Ring Band Stock received by the Collar and into the Working Surface Grove and secured by a Cam Clamp.

The preferred embodiment of making the disclosed Circular Flanged Ring 10 includes the following materials, steps and process: LFQ steel, or other Flanged Ring Band Stock 40 material, is normally receipted in coil form and is decoiled and cut into Flanged Ring Band Stock Strips 41 having Strip First and Second Ends 44, 46, as shown in FIG. 10 the length of the circumference of the Circular Flanged Ring 10 to be produced (Flanged Ring Band Stock Strips 41 of widths other than 3.875" may also be used with the width limited by the configuration of the Spinning Die 50 and the dimensions of the desired Circular Flanged Ring 10). Each Flanged Ring Band Stock Strip 41 is formed into a band form, which is substantially circular as shown in FIG. 10A, for ease of affixing the Strip First and Second Ends 44, 46 together, for example, by butt welding the Strip First and Second Ends 44, 46 together, with the band forming accomplished by means, for example, with a rolling machine including a pyramid rolling machine. The preferred means of connection of the Strip First and Second Ends 44, 46 is by butt welding by use of a tungsten inert gas process with no filler. The butt welding forms the Strip First and Second End Weld 48 and concludes the formation of the Flanged Ring Band Stock 40 as shown in FIG. 10B. It is important, for successful spinning and forming of the circular Flanged Ring 10, that the butt weld of the Strip First and Second Ends 44, 46 not produce a seam. Any seam., ridge, irregularity or any fill in the weld will increase the probability of the seam cracking, as the Flanged Ring Band Stock 40 is stretched in the spinning process, ruining the Flanged Ring Band Stock 40 and creating a safety hazard. The Flanged Ring Band Stock 40 will be received into and secured into a Spinning Die 60 as shown in FIGS. 10, 10A and 10B.

The disclosed process requires the Flanged Ring Band Stock 40 to be rotated or spun for forming and trimming. The Flanged Ring Band Stock 40 may be fixed in a die which is in turn rotated or spun for presentation to and work by various machine tools. The rotation of the die means and Flanged Ring Band Stock 40 may be accomplished, for example, by a lathe with either a vertically or a horizontally mounted Lathe Output Shaft 50. The preferred embodiment, for example, utilizes a lathe with a horizontally mounted Lathe output Shaft 50 to which is mounted, via adaptor and or mounting means, a Spinning Die 60.

The die means may be provided, for example by a Spinning Die 60 shown in FIGS. 9, 9A, and 9B, which in the preferred embodiment, consists of a circular Base Plate 61 formed from approximately 1" thick mild steel plate having a Mounting Surface 62 and a Working Surface 64 and an outside diameter approximately 1" greater than the outside diameter of the Flanged Ring Band Stock 40 which is selected for forming and trimming. Mounting means is provided which enables the Lathe Output Shaft 50 to be located at the effective center of the Mounting Surface 62. On the Working Surface 64 of the Base Plate 61 a die means or fixture receives and secures the Flanged Ring Band Stock 40 and may be provided, for example, by a Collar 70 assembled from components consisting of: 1) a Collar Strip 72 consisting of ⅜" thick ×2" wide mild steel strip which is rolled to a 2" wide strip in a circular form having an inside diameter approximately 1/16 greater than the outside diameter of the Flanged Ring Band Stock 40 and with the strip width of approximately 2". The Collar Strip 72 has End Edges 73, 74. The End Edge 74 is tack welded to the Working Surface 64 of the Base Plate 61 so that the Collar 70 and Spinning Die 60 are concentric around the center of the Spinning Die 60. The interior perimeter of the Collar 70, between the End Edges 73, 74, forms the Insertion Face 76; 2) A Working Surface Groove 66, 1/16"×1/16", is machined into the Working Surface 64 of the Base Plate 61 at the intersection of the Collar Strip End Edge 74 and the Working Surface 64. The Working Surface Groove 66 has an outside diameter equal to the inside diameter of the Insertion Face 76 and inside diameter ideally about ⅓" less than the inside diameter of the Insertion Face 76. The Working Surface Groove 66 accepts the inserted edge of the Flanged Ring Band Stock 40; 3) A ½" thick ×1 ⅜" wide mild steel Mating Strip 80 in a circular form has a Mating Surface 84, Mating Strip Bottom 86, a Mating Surface/Hem Edge 85, and a Mating Face 82 at the interior perimeter of the Mating Strip 80. The Mating Strip 80 is flat burned arc with an inside diameter at the Mating Face approximately about 1/16" greater than the Flanged Ring Band Stock 40 and is tack welded to the Collar Strip End Edge 73 distal from the Working Surface 64 such that the 1 ⅜" wide surface of the Mating Surface 84 is parallel to the Working Surface 64; 4) the Collar 70 assembly is continuously welded between the Collar Strip End Edge 74 and the Working Surface 64 (Collar Strip Second Edge Weld 78) and between the Collar Strip End Edge 73 and the Mating Strip Bottom 86 (Mating Strip Bottom Weld 88) via the mig welding process. The Collar 70 or die or fixture means, receiving the Flanged Ring Band Stock 40, may be provided by means other than described including machining or constructing from a single component or other combinations of components and may have a variety of dimensions depending on the final intended dimensions of the Circular or Oval Flanged Ring 10, 20 to be produced.

Clamping means, including for example Cam Clamps 90, as shown in FIGS. 9A, 9B, 11, 11A and 11B, are affixed to the Working Surface 64 of the Base Plate 61 and positioned to rotate and bind the inserted Flanged Ring Band Stock 40 between the clamp cam and the inner perimeter of the Insertion Face 75 thus securing the Flanged Ring Band Stock 40 between the Cam Clamp 90 and the inner perimeter during the spinning, forming and trimming process. Depending upon the size of the Circular or Oval Flanged Ring 10, 20 to be produced, there will be at a minimum of two Cam Clamps 90 for a 14" diameter Circular Flanged Ring 10 and up to eight or more Cam Clamps 90 for a 60" diameter Circular Flanged Ring 10.

The Spinning Die 60 means will be balanced and will have material strength sufficient to permit smooth and safe rotation up to and exceeding 3,000 rpm. Machining or other steps may be necessary to help insure that the Spinning Die 60 and all structure means or supporting structural member means are truly round and balanced in all axis in order to minimize vibration. The Spinning Die 60 structure may, for example, include the Spinning Die 60, a circular Adapter Plate 100 and a circular Backing Plate 110 with means for securing concentrically the Adapter Plate 100 to the Lathe Output Shaft 50 and the Adapter Plate 100 to the Base Plate 61 Mounting Surface 62. For the production of Circular Flanged Rings 42" diameter and greater, means for concentrically securing, for structural stability, the Backing Plate 110 between the Adapter Plate 100 and the Spinning Die 60. The Adapter Plate 100, for example, may be composed of a ½" thick circular steel plate 14" in diameter having an Adapter Plate Obverse and Reverse Side 102, 104 and having a fixture means, at the Adapter Plate Reverse Side 104, for concentric attachment to the Lathe Output Shaft 50 including threaded means which may be, for example, a Hub 107 providing a female thread for mating with a Lathe Output Shaft 50. The Adapter Plate 100 may, for example, have means for concentric attachment to the Mounting Surface 62 of the Base Plate 61 including Bolt Apertures 109 from the Adapter Plate Reverse to Obverse Sides 104, 102 having therein threaded means with the Bolt Apertures 109 symmetrically positioned on a pattern which will be mirrored and matched by Bolt Apertures 109 from the Mounting Surface to the Working Surface 64 of the Base Plate 61. The additional mass involved in the Spinning Die 60 for Circular Flanged Rings 10 of 42" diameter and greater may require additional structural stability which may be provided, for example, by the utilization of a Backing Plate 110 comprised of a 1" thick circular steel plate 42" in diameter having Backing Plate Obverse and Reverse Sides 111, 112 and mounting means for concentrically mating with the Adapter Plate 100 and the Spinning Die 60. Mounting means for the Backing Plate 110 may include, for example, Bolt Apertures 109 from the Backing Plate Obverse to Reverse Side 111, 112 having threaded means therein and symmetrically positioned on a pattern which will be mirrored and matched by Bolt Apertures 109 for the Adapter Plate 100 and the Spinning Die 60.

The Spinning Die 60 is selected in accordance with the diameter of Circular or Oval Flanged Ring 10, 20 to be produced and the Spinning Die 60 is mounted, by mounting means, on rotation means including a Lathe Output Shaft 50. The workpiece in the form of a Flanged Ring Band Stock 40 is inserted in the Spinning Die 60 against and received by the Insertion Face 75 and Mating Face 82 and into the Working Surface Groove 66 where it is secured by means including clamp means provided, for example, by Cam Clamps 90. The Flanged Ring Band Stock 40 is rotated in preparation for the forming and trimming process.

The forming and trimming of the flanged ring involves standard machine tools and stabilizing devices including:

1) an Internal Roller 120, as shown in FIG. 12, having an Internal Roller Wheel 122 comprising a wheel having a perimeter consisting of a convex wheel working surface and pivot means attached by means to a Internal Roller Tool Fixture 124 provided, for example, by an Internal Roller Handle 126 permitting the wheel to rotate in a plane 90 degrees to a longitudinal axis from an Internal Roller Handle First and Second Ends 127, 128 when the wheel working surface is in contact with the Mating Flange 4 portion of the Flanged Ring Band Stock 40 when clamped into the Spinning Die 60 (the Internal Roller 120 for the preferred embodiment of the disclosed method has a convex working surface with a ½" radius and the Internal Roller Handle 126 proximal to the Internal Roller Wheel 122 has five ¾" diameter holes spaced equally 1 ¼" apart);

2) a Radius Roller 130, as shown in FIG. 13, having a Radius Roller Wheel 132 comprising a wheel having a perimeter consisting of a convex wheel working surface and pivot means attached by means to a Radius Roller Tool Fixture 134 provided, for example, by a Radius Roller Handle 136 permitting the wheel to rotate in a plane parallel to a longitudinal axis from a Radius Roller Handle First and Second Ends 137, 138 when the wheel working surface is in contact with the Hem portion 5 of the Flanged Ring Band Stock 40 when clamped into the Spinning Die 60 (The Radius Roller Wheel 132 for the preferred embodiment of the disclosed method has a convex working surface with a ⅛" radius and the Radius Roller Handle 136 proximal to the Radius Roller Wheel 132 has five ¾" diameter holes spaced equally 1 ¼" apart);

3) a Trim Lever 140, as shown in FIG. 15, comprising a Cutting Tip 142 affixed to a Trim Lever Tool Fixture 144 provided, for example, by a Trim Lever Handle 146 permitting the Cutting Tip 142 to extend parallel with a longitudinal axis from the Trim Lever Handle First to Second Ends 147, 148 with the Cutting Tip 142 for cutting or trimming the hem 5 as the step preliminary to the production of the return flange 6 (The Cutting Tip 142 for the preferred embodiment of the disclosed method has a 1/211 square ×3½" long carbide cutting tip and the Trim Lever Handle 146 proximal to the Cutting Tip 142 has five ¾" diameter holes spaced equally 1¼" apart);

4) a Finishing Roller 150, as shown in FIG. 14, having a Finishing Roller Wheel 152 having a perimeter consisting of a convex wheel working surface and pivot means attached to a Finishing Roller Tool Fixture 154 provided, for example, by a Finishing Roller Handle 156 permitting the Finishing Roller Wheel 152 to rotate in a plane parallel to a longitudinal axis from a Finishing Roller Handle First and Second Ends 157, 158 when the wheel working surface is in contact with the Return Flange 6 portion of the Flanged Ring Band Stock 40 when clamped into the Spinning Die 60 (The Finishing Roller Wheel 152 for the preferred embodiment of the disclosed method has a convex working surface with a ½" radius and the Finishing Roller Handle 156 proximal to the Finishing Roller Wheel 152 has five ¾" diameter holes spaced equally 1¼" apart).

Figure 17:
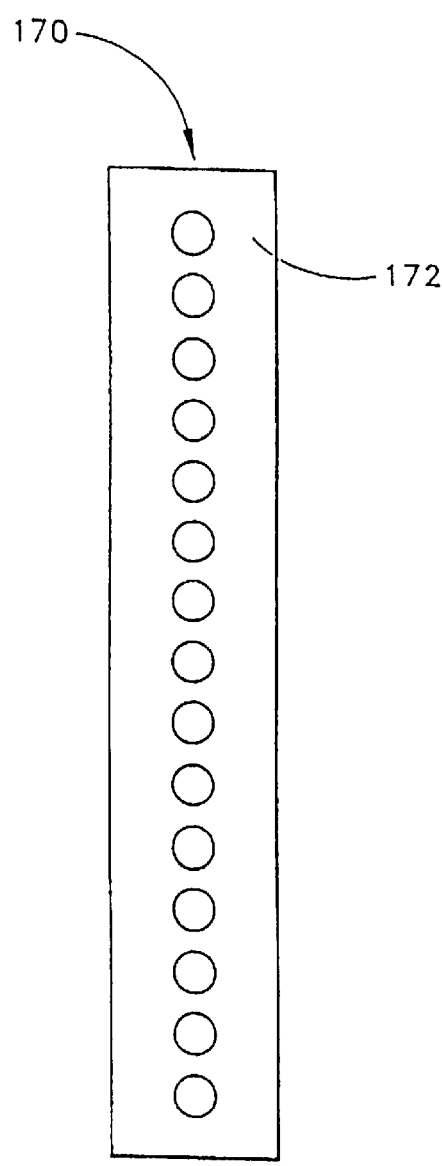
FIG. 17 is a plan view showing a Tool Rest which is affixed to a lathe cradle. The Tool Rest has a plurality of apertures which receive the Power Lever Bottom Surface Pin for positioning and working the machine tools in stretching, forming and trimming the Circular Flanged Ring.
Figure 17A:
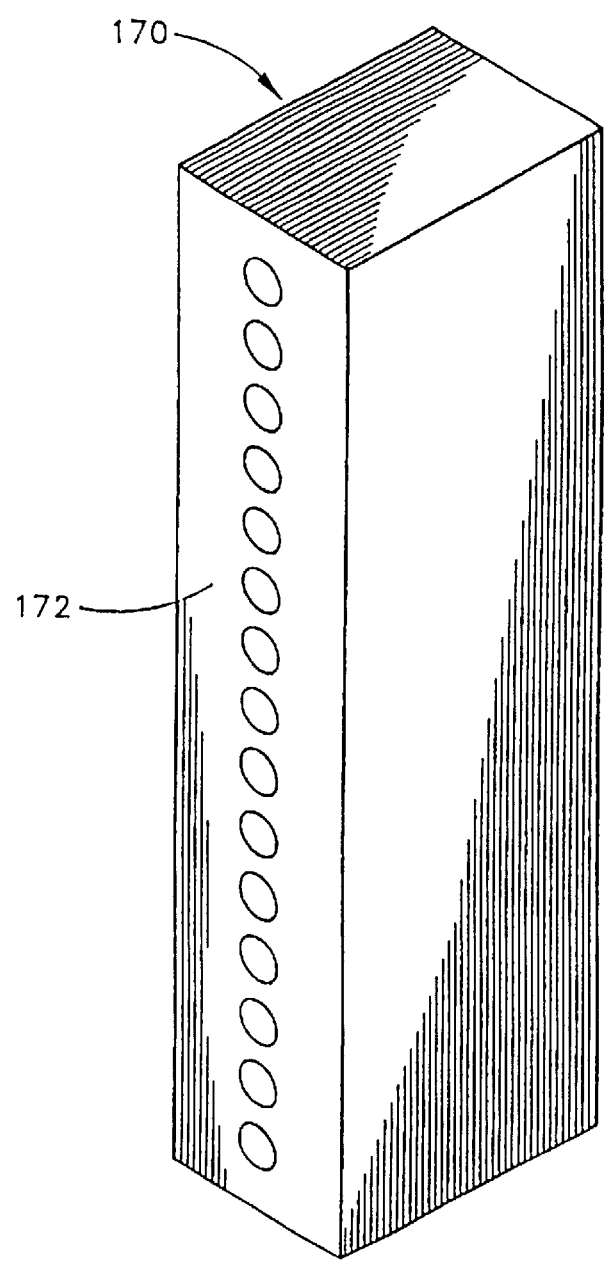
FIG. 17A is a perspective showing the Tool Rest Top and a plurality of apertures which will receive the Power Lever Bottom Surface Pin.

The Internal Roller 120, Radius Roller 130, Trim Lever 140 and Finishing Roller 150 are urged against the appropriate portions of the Flanged Ring Band Stock 40 by machining process means, including by manual/hand manipulated means, automated machine tool means operated and controlled by computers and computer programs and other process control systems and other machine tool processes. Leverage, to manually urge the above machine tools in their-function may, for example, be facilitated by the following:

1) Tool Rest 170, as shown in FIG. 17, which is mounted in a position opposing the rotating Spinning Die 60 at a position where the indicated machine tools may be brought into contact with the Flanged Ring Band Stock 40 and undertake the machining steps described. The Tool Rest 170 may be mounted, for example, on a lathe cradle opposing the Spinning Die 60 within which the various machine tools will operate on the Flanged Ring Band Stock 40. The Tool Rest 170 consists, in the preferred embodiment, of a mild steel block 37" long×3" thick×4" wide with the Tool Rest Top 172 having 30 apertures sized to receive a ¾" diameter pin and spaced 1⅛" apart along the length of the Tool Rest Top 172;

2) a Power Lever 160, as shown in FIGS. 16, 16A and 16B, comprising a Power Lever Head 161 having a Power Lever Head Top and a Bottom Surface 162, 163, a Top Surface Pin 164 ¾" diameter×¾" long extending from the Power Lever Head Top Surface 162 and a Bottom Surface Pin 165 ¾" diameter×¾" long extending from the Power Lever Head Bottom Surface 163. The Top and Bottom Surface Pins 164, 165 are ideally parallel to and offset from each other. The Power Lever Head 161 is affixed to a tool fixture provided, for example, by a Power Lever Handle 167. The Power Lever 160 is used, in the manual/hand production procedure, to provide the pivot point about which the machine tools are operated to attain the leverage required to form, stretch and trim the Flanged Ring and Band Stock 40.

Figure 19:
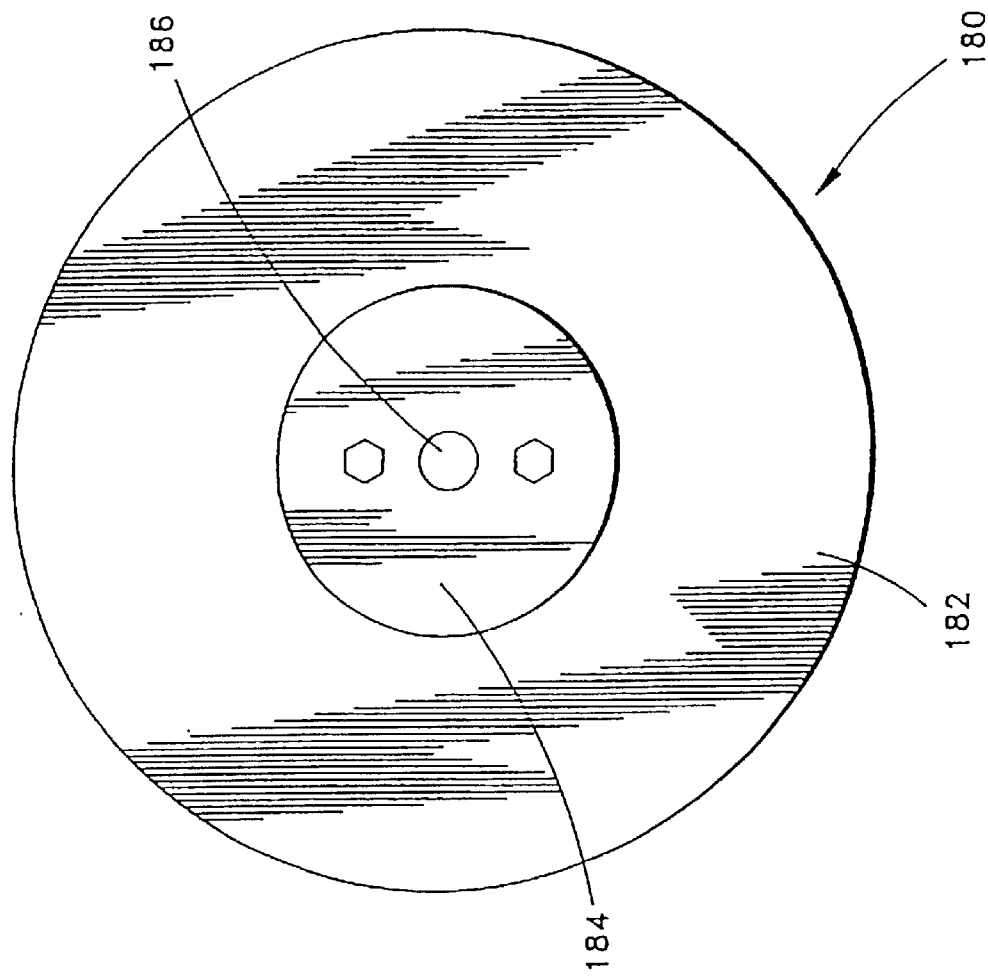
FIG. 19 is a plan view of a Follow Block comprised of Circular Cut Plywood Pieces ¾" thick positioned concentrically with a 1" thick ×6" diameter mild steel Tail Stock Plate having a centrally located Tail Stock Aperture.
Figure 19A:
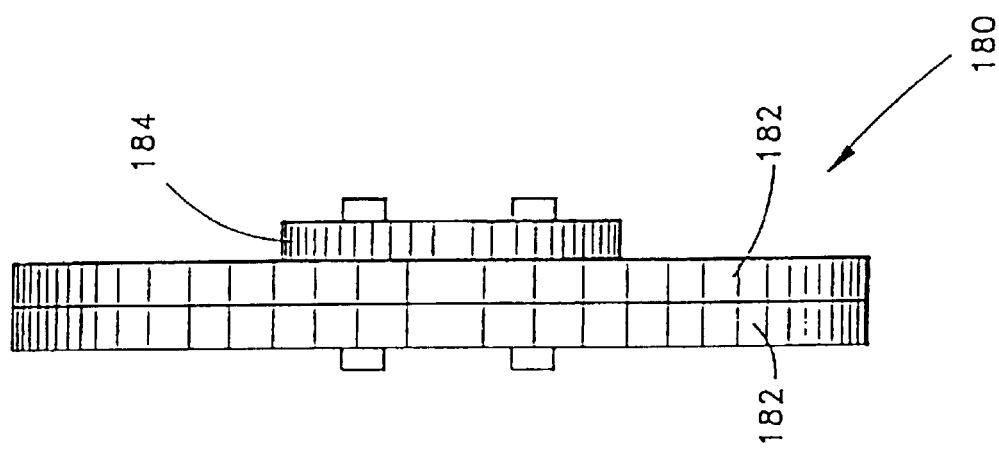
FIG. 19A is an elevation of a Follow Block.
Figure 20:
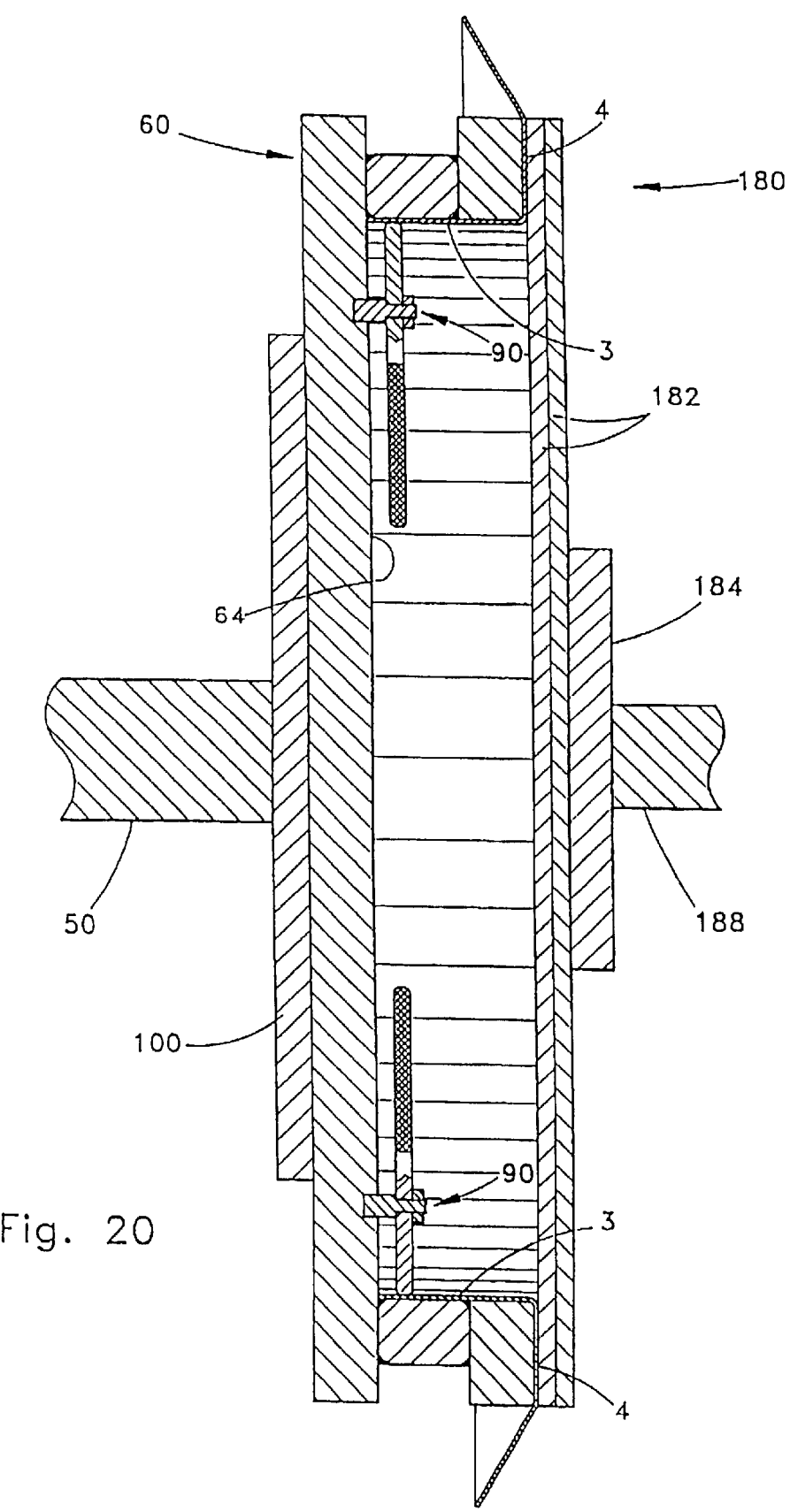
FIG. 20 is an elevation of the assembly restraining the Flanged Ring Band Stock including the Lathe Output Shaft, the Adapter Plate, the Spinning Die, the Flanged Ring Stock, and the Follow Block.

In the preferred embodiment of the method of production by hand, a guide plate means is affixed, following formation of the Mating Flange 4, to a Lathe Tail Stock 188, and is bound by friction against the Mating Flange 4 portion of the Flanged Ring Band Stock 40, thereby securing the Flanged Ring Band Stock 40 between the Mating Surface 84 and e guide plate means. The guide plate means is provided, for example, by a Follow Block 180, as shown in FIGS. 19 and 19A, preferably comprised of two Circular Cut Plywood Pieces 182, each ¾" thick, secured together to form a 1½" thick combined plywood piece, having an outside diameter ideally substantially equal to the outside diameter of the Mating Surface 84. A 1" thick 6" diameter mild steel Tail Stock Plate 184 has a centrally positioned Tail Stock Aperture 186, sized to receive the Lathe Tail Stock 188, is concentrically affixed by means, for instance bolt means, to the Circular Cut Plywood Pieces 182.

Figure 18:
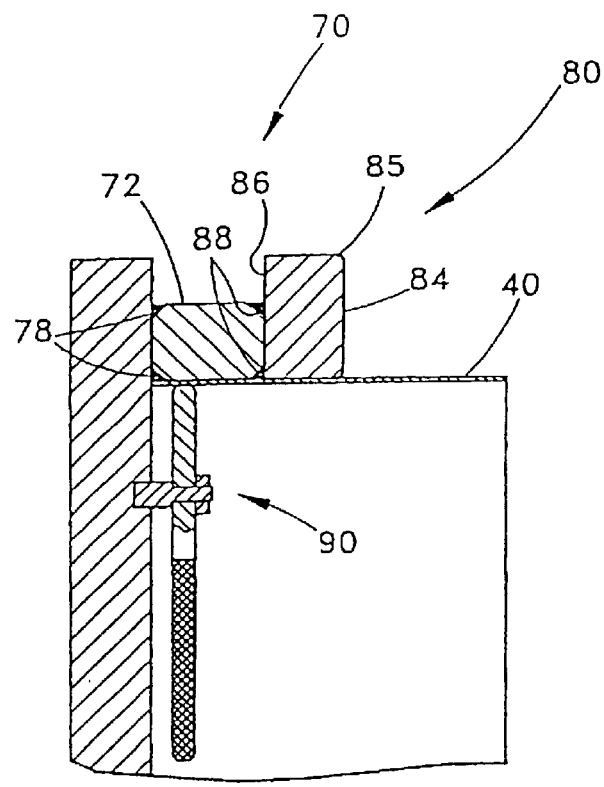
FIG. 18 is a partial cross sectional view showing the Flanged Ring Band Stock inserted into a Spinning Die in preparation for the machining steps to produce a Circular Flanged Ring.

The method disclosed for the production of the Circular Flanged Ring 10 is as follows:
I. The Adapter Plate 100 is mounted to the Lathe Output Shaft 50.
II. The Spinning Die 60 (with Backing Plate 110 when the Circular Flanged Ring 10 diameter is 4211 and greater) is mounted to the Adapter Plate 100.
III. A Flanged Ring Band Stock 40 is inserted into the Spinning Die 60 and secured by clamps, as shown in FIG. 18.
IV. A Tool Rest 170 is mounted on a lathe cradle. A Power Lever 160 via a Bottom Surface Pin 165 is inserted into an aperture at the Tool Rest Top 172.
V. The lathe is powered causing the Spinning Die 60 to revolve. VI. An Internal Roller 120 is positioned on the Top Surface Pin 164 of the power lever via an aperture in the Internal Roller Handle 126. The Internal Roller Wheel working surface 122 is positioned on the inside of Flanged Ring Band Stock 40 at the outer 1/16" of the Flanged Ring Band Stock 40 distal from the Working Surface 62 and causes the portion of the Flanged Ring Band Stock 40 extending past the Mating Face 82 to be stretched and bent against the Mating Surface 84 forming a Mating Flange 4, as shown in FIG. 18A.

Figure 1:
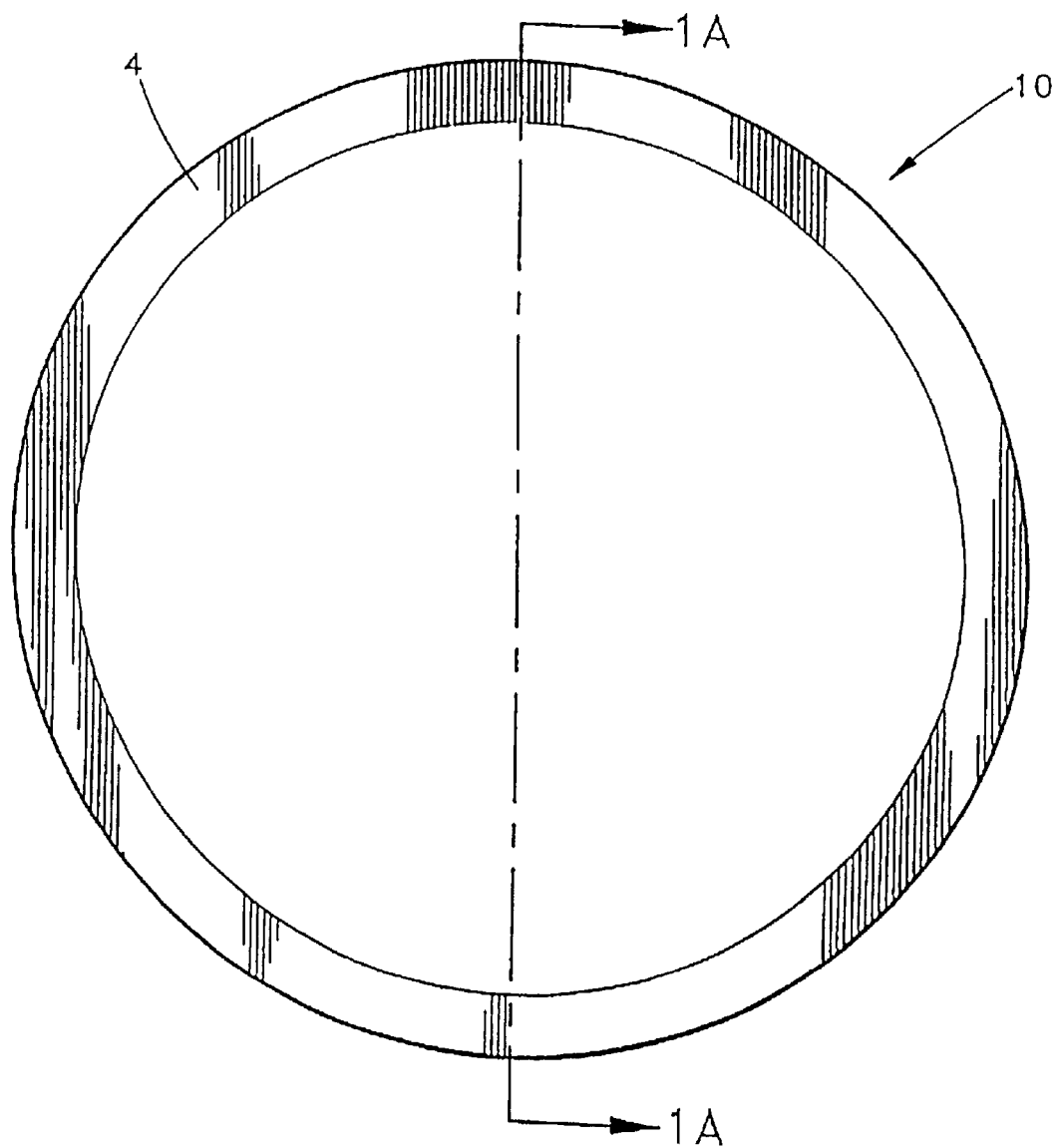
FIG. 1 is an elevation view of the Circular Flanged Ring.
Figure 1A:
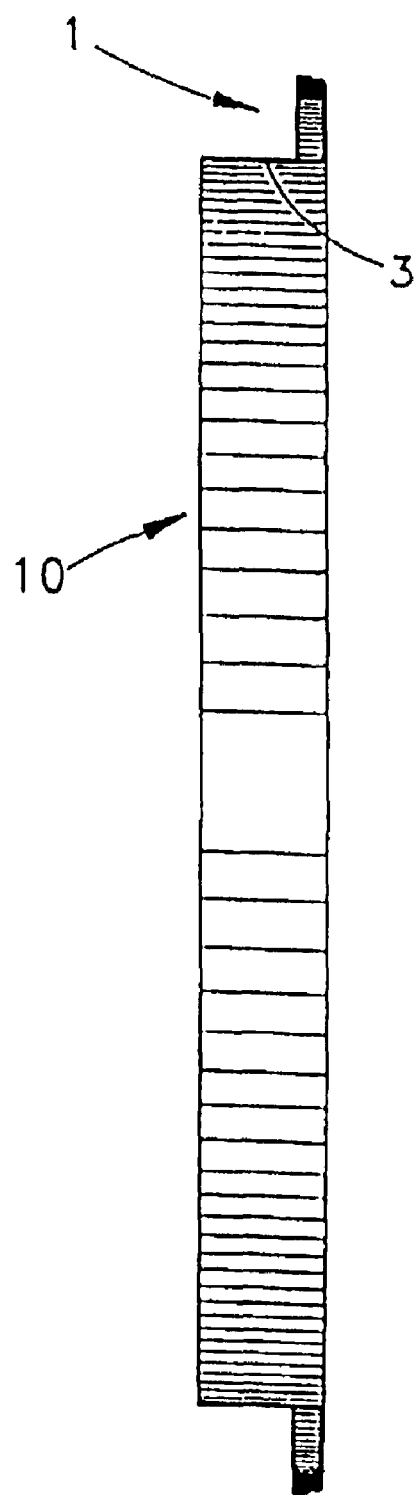
FIG. 1A is a section of FIG. 1 showing the cross section or profile of a T24 SMACNA Circular Flanged Ring and effectively the elevation view representative of both Circular and Oval Flanged Rings.
Figure 5A:
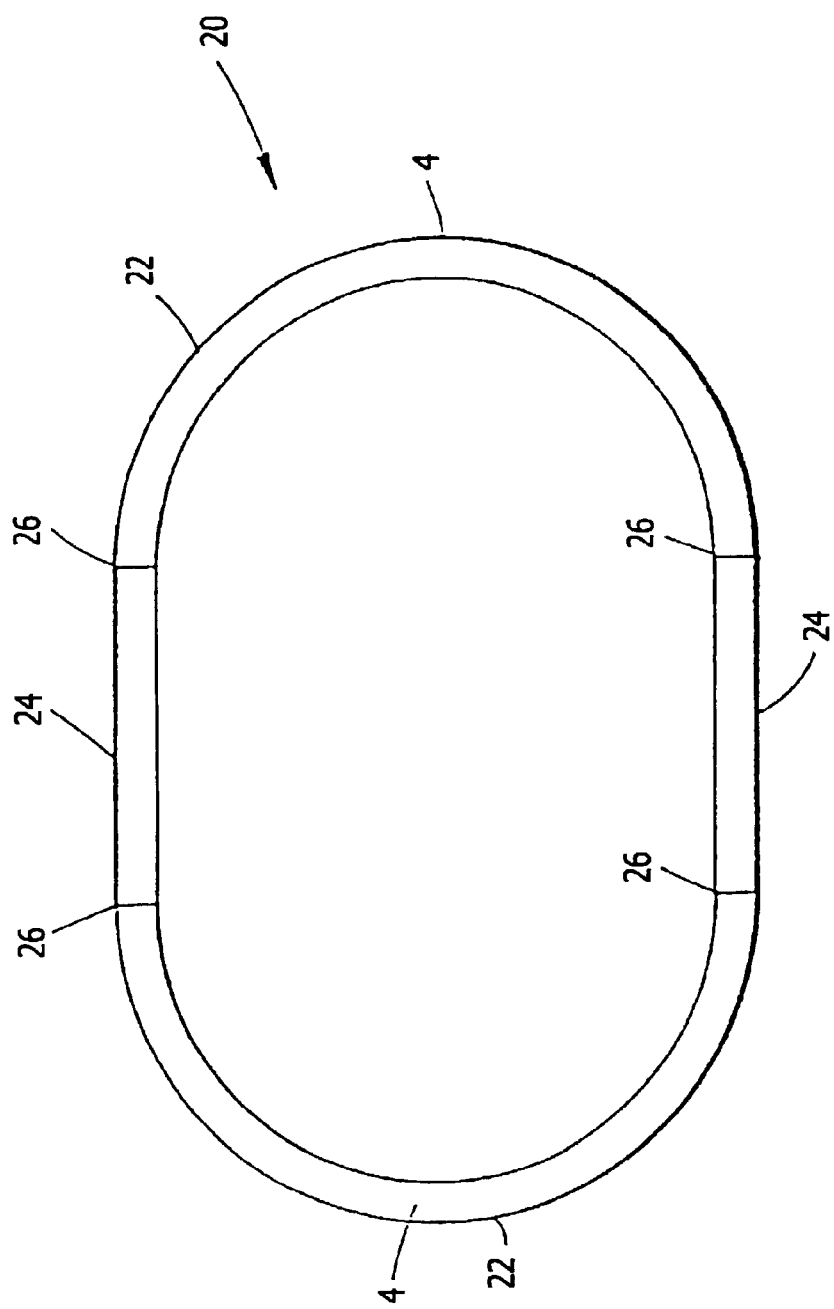
FIG. 5A is a plan view of an assembled Oval Flanged Ring depicting the connection of the Semicircular Flanged Ring Portions to the SMACNA T24 Linear Segments by means of welding.
Figure 6:
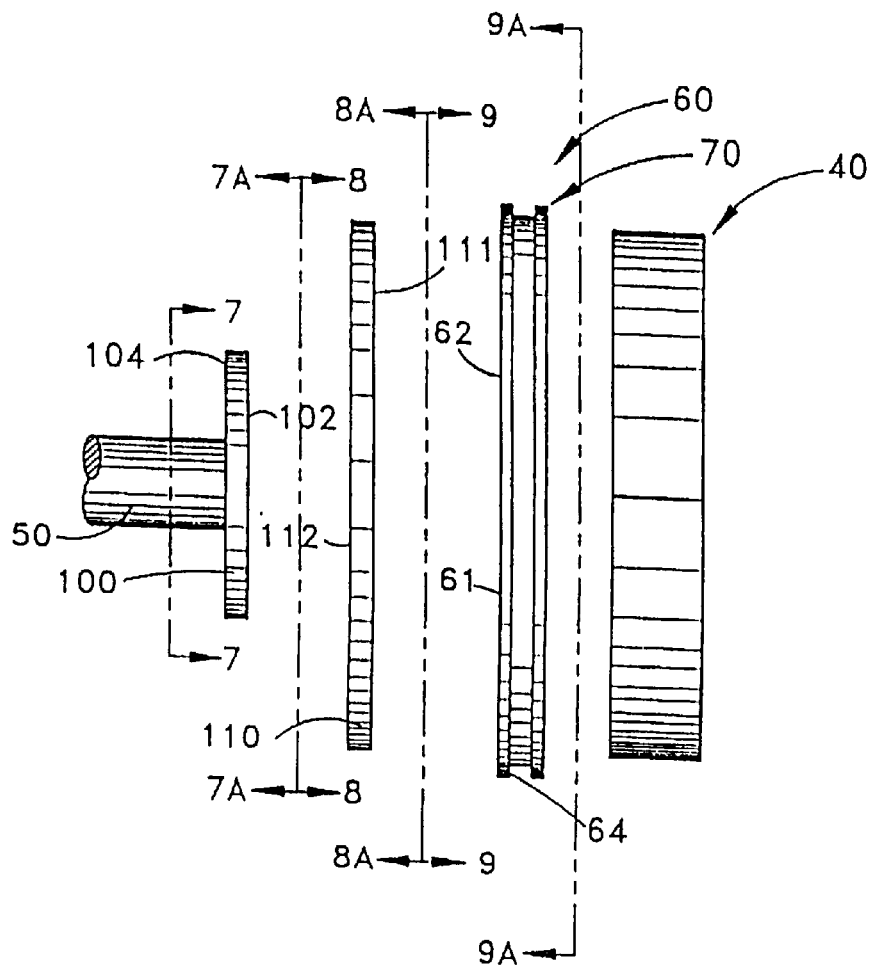
FIG. 6 is an exploded side view of a Lathe Output Shaft with attached Adapter Plate, Backing Plate and Spinning Die.
Figure 7:
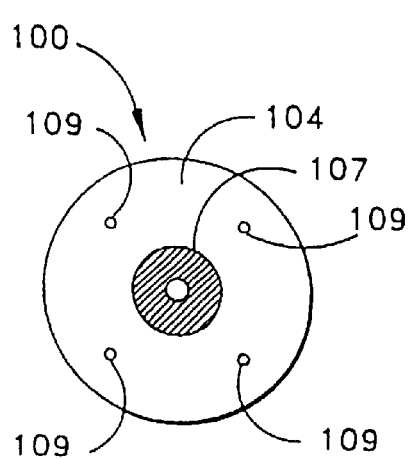
FIG. 7 is an elevation view of the Adapter Plate Reverse Side.
Figure 7A:
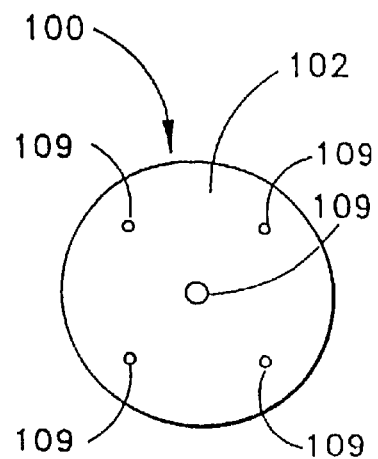
FIG. 7A is an elevation view of the Adapter Plate Obverse Side.
Figure 8:
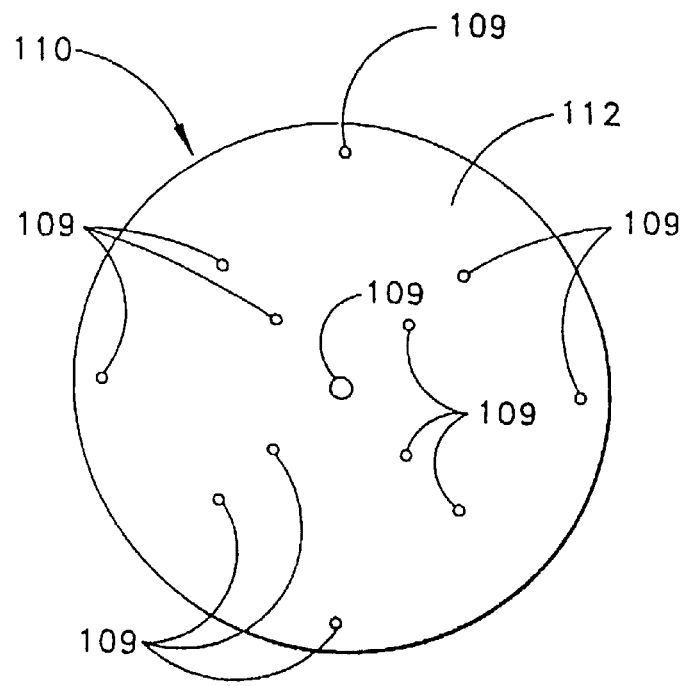
FIG. 8 is an elevation view of the Backing Plate Reverse Side.
Figure 8A:
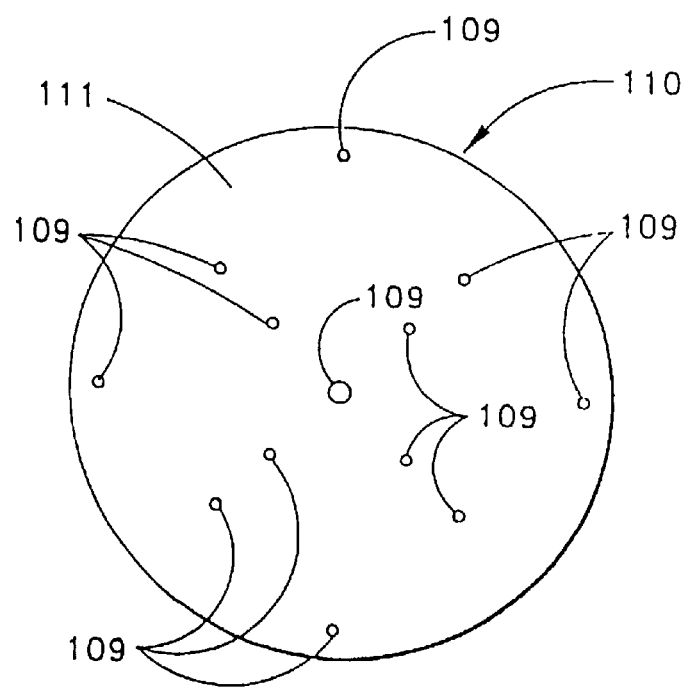
FIG. 8A is an elevation view of the Backing Plate Obverse Side.
Figure 18A:
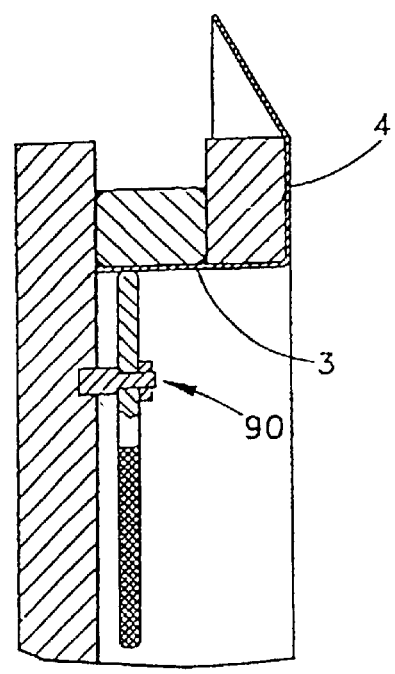
FIG. 18A is a partial cross-sectional view showing the results of the first machining step which is to stretch the portion of the Flanged Ring Band Stock which protrudes from the Spinning Die into a Mating Flange.
Figure 18B:
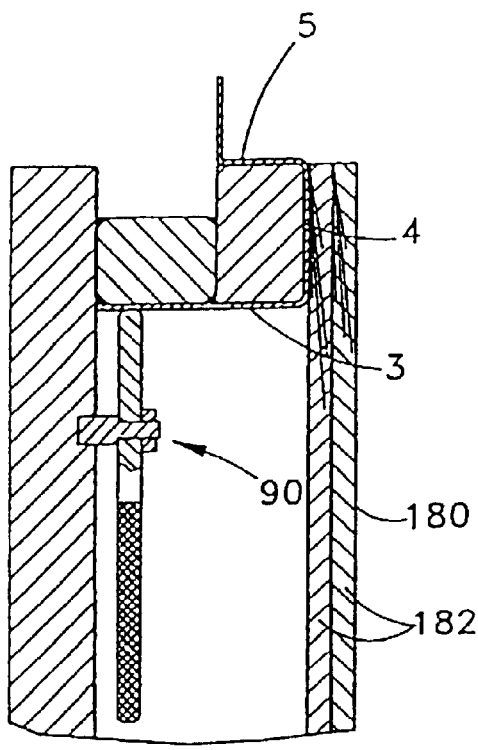
FIG. 18B is a partial cross-sectional view showing the association of the Follow Block with the Mating Flange and the forming of the Hem.
Figure 18C:
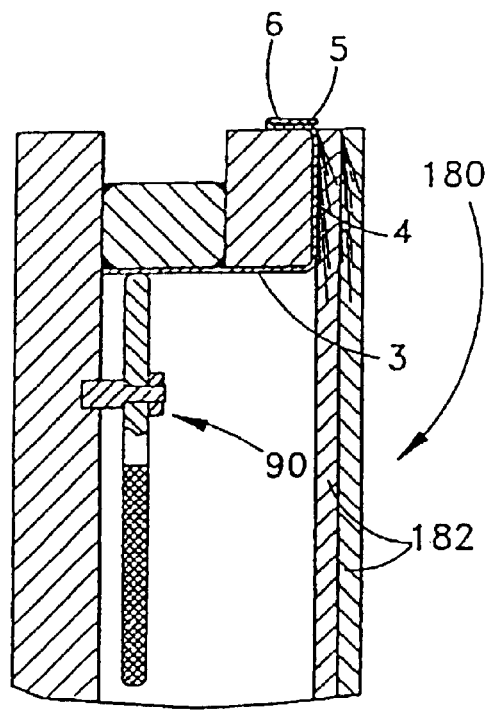
FIG. 18C is a partial cross-sectional view showing the final step consisting of forming the Return Flange of the Circular Flanged Ring.

The portion of the Flanged Ring Band Stock 40 received into the Collar 70 and against the Insertion Face 75 is the Insertion Flange 3 forming approximately a 90 degree angle with the Mating Flange 4, as shown in FIG. 18A. The portion of the Flanged Ring Band Stock 40 extending from the Mating Flange 4 portion of workpiece distal from the Insertion Flange 3 and toward the portion of the Flanged Ring Band Stock 40 which will include the Hem 5 is bent against the Mating Surface/Hem Edge 85 forming an approximate 20 degree angle between the Hem portion and the Mating Flange 4, as shown in FIG. 18A. This concludes the machine tool activity required of the Internal Roller 120.
VII. Upon conclusion of forming by the Internal Roller 120 a Follow Block 180 is positioned against the Mating Surface 84. The portion of the Flanged Ring Band Stock 40 distal from the Insertion Flange 3 and Mating Flange 4, which will form the Hem 5 and the Return Flange 6 extends beyond the Mating Surface 84 and the Follow Block 180 and is accessible to machine tool operations. The Internal Roller 120 is removed from the Power Lever 160 and replaced with a Radius Roller 130. The Radius Roller Wheel 132 convex working surface is positioned at a 45 degree angle to the Mating Surface 84 and initially is placed in contact with the Follow Block 180 in order to bring the Radius Roller Wheel 132 up to speed. The Radius Roller Wheel 132 is then forced onto the exposed portion of the Flanged Ring Band Stock 40 at the Mating Surface/Hem Edge 85 causing the metal to stretch in contact with and following the contour of the Hem Surface 76 forming, proximal to the Mating Flange 4, the Hem 5, as shown in FIG. 18B. That portion of the Flanged Ring Band Stock 40 most distal from the Insertion Flange 3 forms an approximately 90 degree angle with the Hem 5 and constitutes the portion of the Flanged Ring Band Stock 40 which will be formed into the Return Flange 6, as shown in FIG. 18B.
VIII. The Radius Roller 130 is removed from the Power Lever 160 and replaced with the Trim Lever 140. The Cutting Tip 142 is placed in contact with the outside edge of the portion of the Flanged Ring Band Stock 40 which will form the Return Flange 6 and cuts away metal sufficient to leave approximately ⅜" for the Return Flange 6.
IX. The Trim Lever 140 is removed from the Power Lever 160 and replaced with the Finishing Roller 150. The right side of the Finishing Roller Wheel 152 is placed in contact with the edge of the Flanged Ring Band Stock 40 most distal from the Insertion Flange 3, at an approximate 45 degree angle with the Flanged Ring Band Stock 40 which has been trimmed, allowing the Finishing Roller Wheel 152 to be brought up to the speed of the Spinning Die 60. The Finishing Roller Wheel 152 is urged against the edge of the Flanged Ring Band Stock 40 causing the metal to fold back onto and in contact with the Hem 5 thus forming the Return Flange 6.
X. The lathe is turned off and the completed Circular Flanged Ring 40 is removed from the Spinning Die 60. The method disclosed for the production of the Oval Flanged Ring 20 is as follows:
I. A Circular Flanged Ring 10 is produced and is cut along a diameter producing two Semi-circular Flanged Ring Portions 22.
II. SMACNA T24 Linear Segments 24 are produced with the SMACNA T24 Flange Profile I by roll forming or other method.
III. The SMACNA T24 Linear Segments 24 are affixed by means, including welding, to the Semi-circular Flanged Ring Portions 22 to form the Oval Flanged Ring as shown in FIGS. 5 and 5A.

Figure 21:
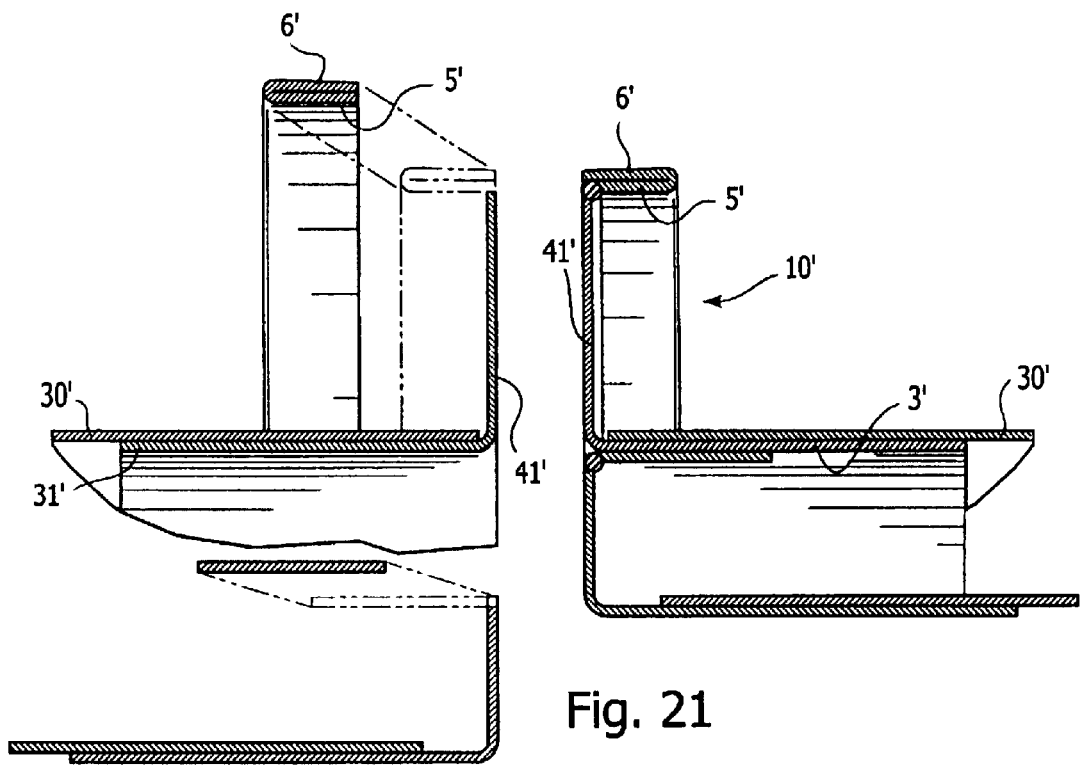
FIG. 21 is a view similar to FIG. 2 showing an alternative embodiment of the sent invention.

FIG. 21 illustrates an alternative to the foregoing described method for producing flanged ring 10'. In the alternative method, the mating flange 4' can be produced as described above, and then the outer perimeter of the mating flange trimmed to provide a desired maximum diameter. Thereafter the hem 5' and the return flange 6' can be formed as a separate component by various methods, such as bending flat stock over on itself and then rolling the flat stock into a circular ring. The ends of the rolled, bent-over flat stock could be butt welded together, and then welded to the outer perimeter of the flange 4'.

The hem 5 and flange 6 could instead be formed by a stamping process beginning with a flat, annular workpiece. Thereafter, the formed hem and flange could be welded to the outer perimeter of the mating flange 4'. Producing the hem 5' and return flange 6' as a separate component and then attaching such component to the outer perimeter of the mating flange 4' may not be as efficient as spin-forming the entire flange ring 10' as described above with respect to flange ring 10. Also, this "2-step" method may result in a certain amount of distortion when the formed hem 5'/flange 6' is welded to the mating flange 4'. Nonetheless, the 2-step method may be carried out with less sophisticated tooling than required by the spinning method described above.

Figure 22:
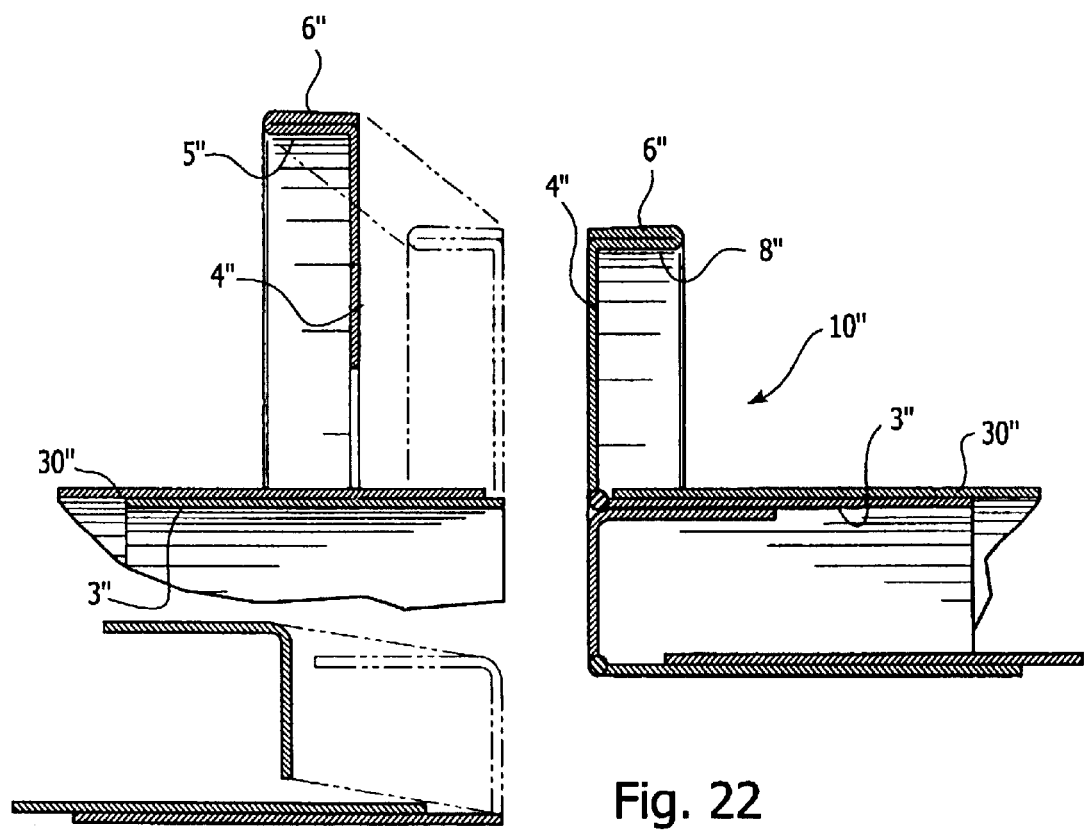
FIG. 22 is a view similar to FIG. 21 showing a further alternative embodiment of present invention.

As a further alternative, it is possible to produce the flanged Ring 10" shown in FIG. 22 by forming the insertion flange 3" as one component and the mating flange 4", hem 5" and return flange 6" as a second component. The insertion flange 3 can be produced as shown in FIGS. 10–10B and as described above. The mating flange 4", hem 5" and return flange 6" could be produced by roll-forming or perhaps by stamping. Thereafter, the two components can be assembled by welding the inside perimeter of the mating flange to the end edge of the insertion flange. This alternative technique may suffer from the same disadvantages of the technique shown in FIG. 21 above, including a larger number of manufacturing steps as well as significant distortion or warpage of the flanged Ring 10" due to the welding operation. On the other hand, it may be possible to produce the flanged Ring 10" using less sophisticated tooling than used to produce the flanged Ring 10, as described above.

FIGS. 23A, 23B, 23C, 23D, 23E, and 23F illustrate an alternative to the foregoing described methods for producing a flanged ring 10'''. In this alternative method, a mating flange 4''' can be spin formed as described above. Thereafter, the hem section 5''' can be formed by a first roller set 200 consisting of a first roller assembly 202 composed of a major diameter roller 204 and a side-by-side smaller diameter roller 206, both mounted on a rotatable shaft 208. The first roller set 200 also includes a second roller assembly 210 consisting of a roller 212 mounted on a rotatable shaft 214. The rotatable roller shafts 208 and 214 may be moved towards and away from each other in a substantially parallel orientation in a well-known manner. When the shafts are moved toward each other, the roller 212, positioned at the side of roller 204, forms the hem section 5''' by capturing such hem section between the adjacent face sections of the rollers 204 and 212. In addition, a precursor to the return flange 6''' is formed between the outer diameter of roller 212 and the outer diameter of roller 206. See FIG. 23B wherein the hem section 5''' extends substantially perpendicular to mating flange 4''' and the precursor to the return flange 6''' extends substantially perpendicular to the adjacent end of the hem section.

Figure 23A:
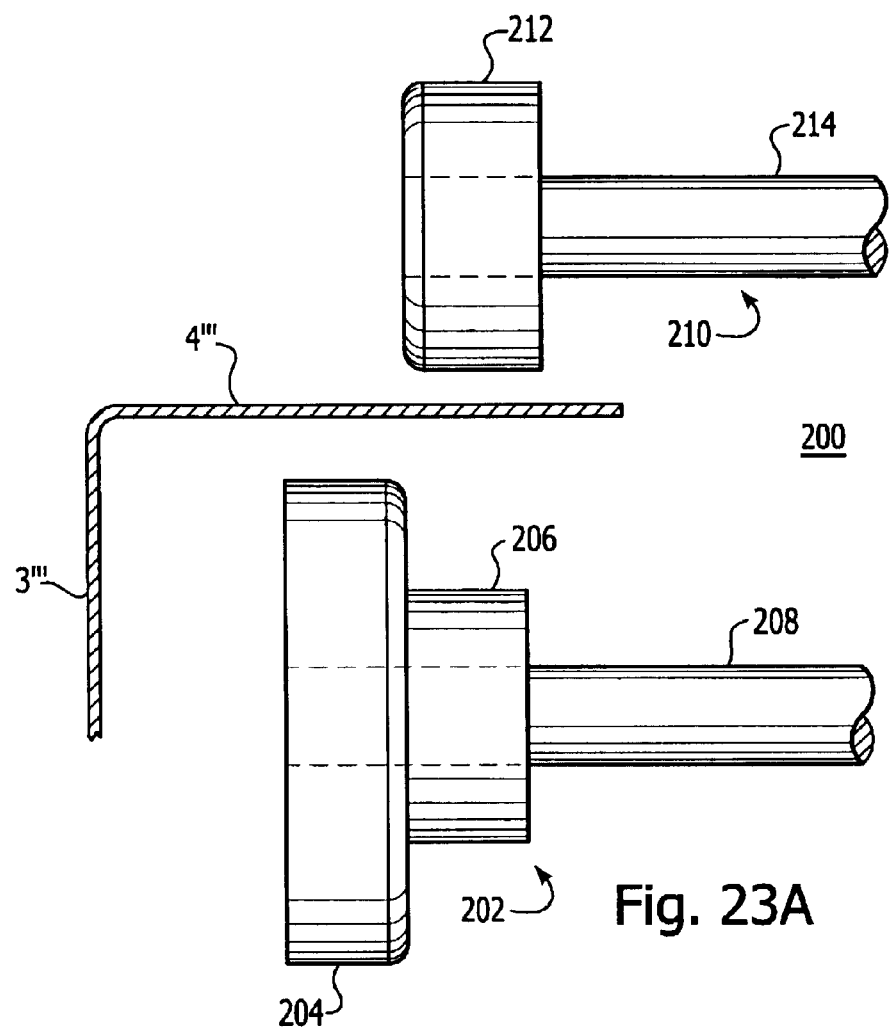
Figure 23B:
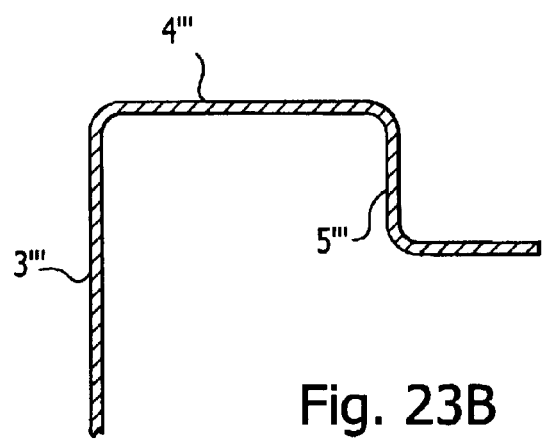

The partially formed Flanged Ring 10''' of FIG. 23B is placed in a roller set 220 of FIG. 23C for further processing. The roller set 220 includes a die roller assembly 222 composed of a die roller 224 mounted on a rotatable shaft 226. The die roller 224 has a groove formed around its outer perimeter in the shape of a half "V" composed of a vertical face 228 and a diagonal face 230. The roller set 222 also includes a second roller assembly 232 composed of a cylindrical roller 234 mounted on a rotatable shaft 236. The roller assemblies 224 and 232 are capable of moving towards and away from each other while the rotatable shafts 226 and 236 remain substantially parallel to each other. As shown in FIG. 23C, the partially formed Flanged Ring 10''' from FIG. 23B is positioned relative to roller 224 so that hem section 5''' is adjacent vertical face 228 of roller 224. Thereafter, the roller sets 222 and 232 are moved towards each other as the rollers 224 and 234 rotate relative to each other thereby causing the return flange section 6''' to assume the orientation of roller face 230 relative to roller face 228, as shown in FIG. 23D.

Figure 23E:
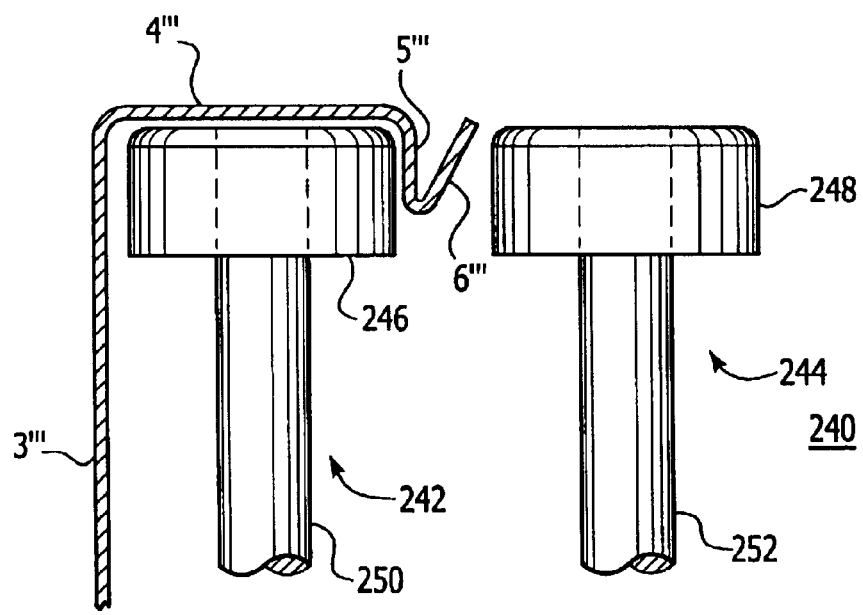
Figure 23F:
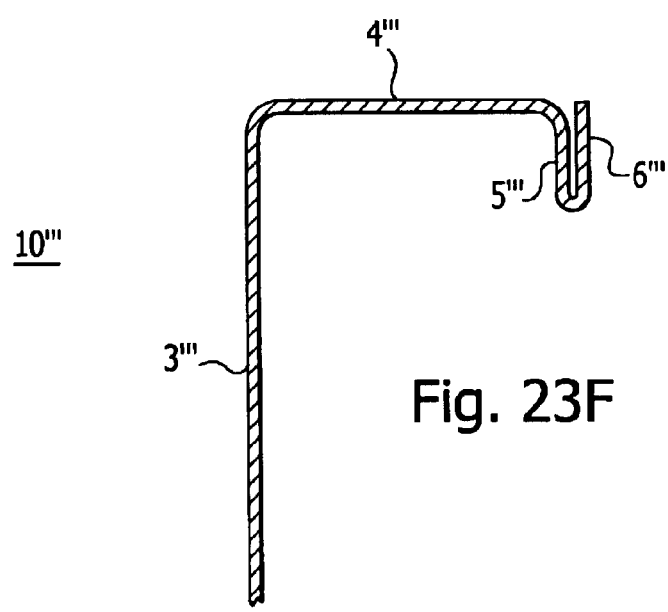

Thereafter, the flanged ring in the configuration of FIG. 23D is further formed by roller set 240 shown in FIG. 23E. Roller set 240 consists of a pair of roller assemblies 242 and 244 each composed of a roller 246 and 248 carried by a corresponding rotatable shaft 250 and 252. As shown in FIG. 23E, the hem section 5''' and the partially formed return flange 6''' are placed between the two rollers 246 and 248 and then the two rollers are moved relatively towards each other while rotating, thereby to pinch the hem section and return flange therebetween so that the return flange closely overlies the hem section and thereby completing the formation of the flanged ring 10''', as shown in FIG. 23F.

Figure 24A:
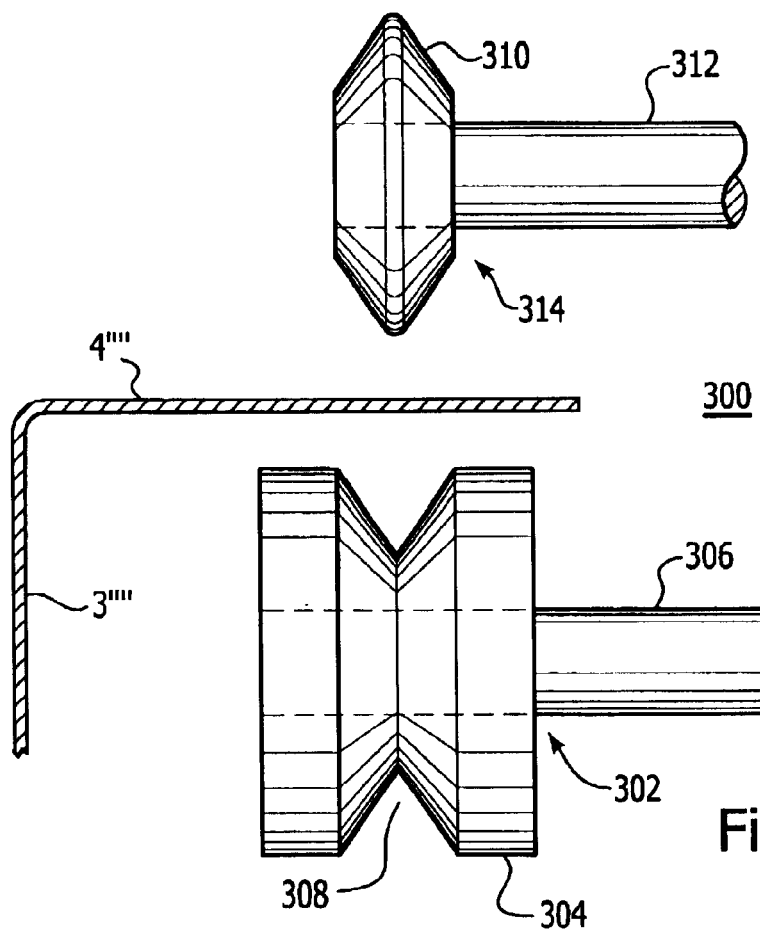
FIGS. 24A, 24B, and 24C, and 24D illustrate a further alternative method of forming the present invention.
Figure 24B:
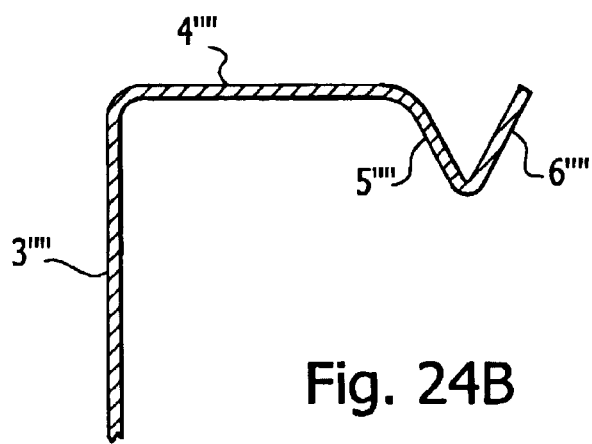

FIGS. 24A, 24B, 24C, and 24D illustrate another method of forming a flanged ring 10''' in accordance with the present invention. As illustrated, the mating flange 4'' '' of the flanged ring 10''' is formed using a spin forming method, such as described above. Thereafter, the outer marginal portion of the mating flange is placed in roller set 300 to partially form hem section 5'' '' and return flange 6'' '', as shown in FIG. 24B. The roller set 300 includes a first roller assembly 302 consisting of a roller die 304 mounted on the rotatable shaft 306. A "V" shaped groove 308 extends around the circumference of the roller die 304 to match the outer perimeter profile of a roller die 310 mounted on rotatable shaft 312 of a roller assembly 314. The roller assemblies 302 and 314 are capable of moving towards and away from each other while their respective shafts 306 and 302 rotate and maintain an orientation substantially parallel to each other. As a consequence, when the outer marginal portion of the mating flange 4'' '' is placed in alignment with groove 308 and then the roller dies 304 and 310 rollably engage with each other they cooperatively form hem section 5'' '' and return flange 6'' '' in the orientation shown in FIG. 24B.

Figure 24C:
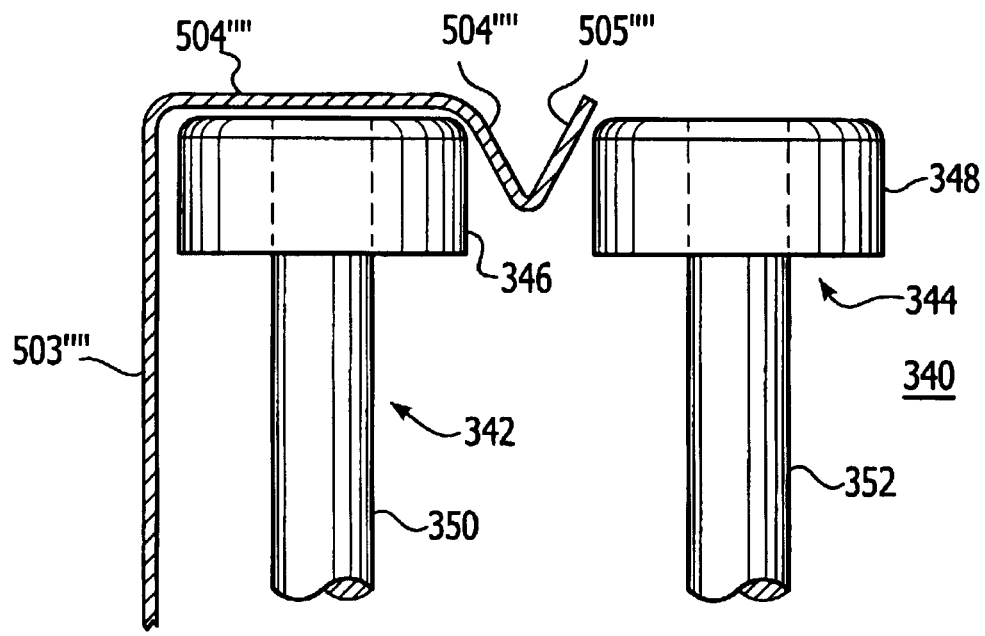
Figure 24D:
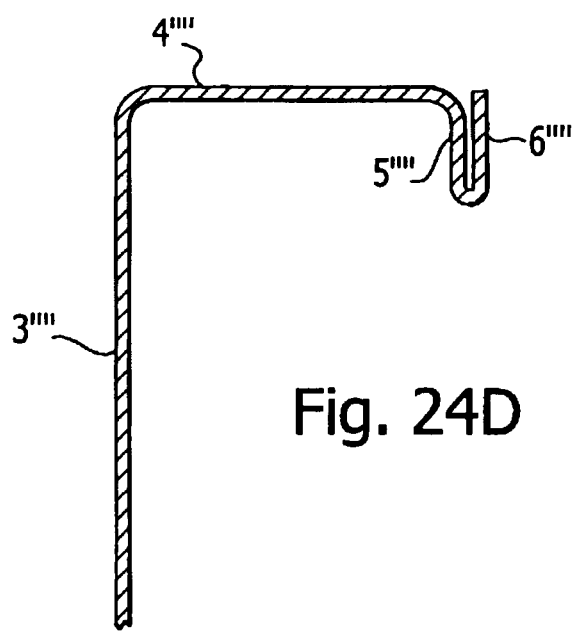

Thereafter, the partially formed flanged ring shown in FIG. 24B is further worked by roller set 340 shown in FIG. 24C. The roller set 340 corresponds to the roller set 240 shown in FIG. 23E, with the description set forth above with respect to FIG. 23E applying to FIG. 24C, but with the part numbers increased by 100. Thus, such description will not be repeated. The result of roller set 340 is a finished flanged ring 10'' '' as shown in FIG. 24D.

It will be appreciated that other combinations of roller sets could be utilized to form the hem section and return flange of the flanged ring, other than as illustrated above in FIGS. 23 and 24. Although use of such rolling techniques may not be as efficient as spin forming the entire flange ring in the manner described above, utilizing rolling processes may enable the flange ring to be manufactured with less expensive tooling or with tooling already on hand as opposed to requiring extensive spin form tooling.

The embodiments of the invention in which an exclusive property or privilege is claimed are defined as follows:

1. A method of spin-forming flanged rings from thin gauge metal, said flange rings used for interconnecting adjacent sectional ends of thin gauge ducting for heating, ventilating and air conditioning systems, the ducting having an inner diameter, the method comprising:
   (a) placing a cylindrical, collar-shaped workpiece composed of 10-gauge or higher gauge metallic material into a spin die, the spin die having an end edge portion, the workpiece being substantially devoid of any deformations along its circumference and having a first end portion extending outwardly of the spin die beyond the end edge portion of the spin die when the workpiece is placed in the spin die;
   (b) locking the workpiece to the spin die;
   (c) spinning the cylindrical, collar-shaped workpiece about its central axis substantially corresponding to the concentric center of the workpiece by spinning a spin die;
   (d) forming the first end portion of the collar-shaped workpiece as the workpiece is spinning to expand the first end portion of the workpiece against the end edge portion of the spin die to define a generally annularly-shaped mating flange extending substantially transversely to the central axis of the remainder of the collar-shaped workpiece, the remainder of the workpiece retaining its original cylindrical, collar-shaped configuration for serving as an insertion flange for insertion within the sectional end of the ducting to be connected; and
   (e) forming the workpiece as the workpiece is spinning to force the outward marginal portion of the transverse mating flange over, to form a hem section disposed substantially concentrically to the insertion flange and extending outwardly from the mating flange substantially concentrically to the insertion flange.

2. The method according to claim 1, further comprising forming a return flange while the workpiece is spinning by turning a portion of the hem section located distally from the mating flange over on itself.

3. The method according to claim 2, wherein the profile of the spin-formed flange ring corresponds to the standards of the Sheet Metal and Air Conditioning Contractors National Association.

4. The method of claim 1, wherein the hem section extends outwardly from the mating flange in substantially the same direction that the insertion flange extends from the mating flange.

5. The method of claim 4, further comprising forming a return flange with the workpieces spinning by turning a portion of the hem section located distally from the mating flange over on itself.

6. The method according to claim 1:
   wherein the hem section defining an edge portion distal from the mating flange;
   further comprising forming a return flange by applying at least one forming tool to the edge portion of the hem section so as to turn a portion of the hem section over on itself as the workpiece is spinning.

7. The method of claim 1, further comprising:
   (a) diametrically cutting the flanged ring formed by the method of claim 1 into two generally semi-circularly shaped ring halves, each of said ring halves defining an end portion at the end of each semi-circular shaped ring half;
   (b) placing substantially straight lengths of flange sections between the corresponding ends of the semi-circularly shaped ring halves to form a generally oval shape, the flange straight lengths having been preformed into a cross-sectional shape generally corresponding to the cross-sectional shapes of the two semi-circular ring halves; and
   (c) affixing the ends of the straight flange lengths to the corresponding ends of the two semi-circular ring halves to form a singular oval-shaped connection ring.

8. The method of claim 7, wherein the substantially straight flange lengths having ends affixed to the corresponding ends of the semi-circular ring halves by welding.

9. The method of claim 1, further comprising forming the collar-shaped workpiece from a length of thin gauge flat stock metal prior to spin-forming the workpiece into the flanged ring.

10. The method according to claim 9, further comprising rolling the thin gauge flat stock metal into a generally circular collar shape defining adjacent end portions, and attaching said end portions together to form a seamless joint.

11. The method of claim 10, further comprising placing the collar-shaped workpiece into the spin die without substantially any further working of the workpiece.

12. A method of forming, by spin-forming techniques, flanged rings from thin gauge metal, said flange rings used for interconnecting adjacent sectional ends of thin gauge ducting for heating, ventilating and air conditioning systems, the ducting having an inner diameter, the method comprising:
   (a) locking a collar-shaped workpiece in a spin die, the workpiece composed of from 10–20 gauge metallic material, the collar-shaped workpiece being substantially devoid of any crease extending circumferentially around the workpiece, the workpiece having a first end portion and an outer diameter corresponding to the inner diameter of the sectional ends of the ducting to be connected;
   (b) spinning the spin die with the workpiece lock herein about the central axis of the collar-shaped workpiece;
   (c) forming the first end portion of the collar-shaped workpiece as the workpiece is spinning to expand the first end portion of the workpiece to define a generally annular shaped mating flange extending generally transversely to the central axis of the remainder of the collar-shaped workpiece to define an outer perimeter, the remainder of the workpiece retaining its original collar-shaped configuration serving as an insertion flange for insertion within the sectional ends of the ducting to be connected;
   (d) further forming the workpiece as the workpiece is spinning to define a hem section, the hem section extending outwardly from the outer perimeter of the mating flange substantially concentrically to the insertion flange; and
   (e) forming a return flange while the workpiece is spinning by folding a portion of the hem section located distally from the mating flange over on itself.

13. The method according to claim 12, wherein the profile of the spin-formed flange ring conforms to the standards of the Sheet Metal and Air-Conditioning Contractors National Association.

14. The method of claim 12, further comprising:
   (a) the generally collar-shaped insertion flange having a desired outer diameter;
   (b) placing the workpiece into a generally cylindrically shaped spin die prior to spin forming the mating flange, the spin die having an internal diameter substantially corresponding to the desired outside diameter of the insertion flange of the flange ring, the spin die also having a generally annularly shaped end edge corresponding to the annular shape of the mating flange; and (c) rotating the workpiece by rotating the spin die.

15. The method according to claim 12, wherein:

(a) the generally cylindrically-shaped spin die having an end edge;

(b) when the workpiece is placed into the spin die, a portion of the insertion flange of the workpiece extending outwardly from the interior of the spin die beyond the end edge of the spin die; and (c) the mating flange is spin-formed by using a tool to expand the portion of the workpiece extending outwardly beyond the end edge of the spin die to a position adjacent the end edge of the spin die, with the thusly expanded portion of the workpiece projecting radially beyond the outer diameter of the end edge of the spin die.

16. The method of claim 1, wherein an oval-shaped flanged ring is formed by: p1 (a) diametrically cutting the flanged ring formed by the method of claim 12 into two generally semi-circularly shaped ring halves, each of said ring halves defining an end portion at the end of each semi-circular shaped ring half;

(b) placing substantially straight lengths of flange sections between the corresponding ends of the semi-circularly shaped ring halves to form a generally oval shape, the flange straight lengths having been preformed into a cross-sectional shape generally corresponding to the cross-sectional shapes of the two semi-circular ring halves; and (c) affixing the ends of the straight flange lengths to the corresponding ends of the two semi-circular ring halves to form a singular oval-shaped connection ring.

17. The method of claim 16, wherein the substantially straight flange lengths having ends affixed to the corresponding ends of the semi-circular ring halves by welding.

18. The method of claim 12, further comprising forming the collar-shaped workpieces from a length of thin gauge flat stock metal prior to spin-forming the workpiece into the flanged ring.

19. The method according to claim 18, further comprising rolling the thin gauge flat stock metal into a generally circular collar shape defining adjacent end portions, and attaching said end portions together to form a seamless joint.

\* \* \* \* \*

UNITED STATES PATENT AND TRADEMARK OFFICE
CERTIFICATE OF CORRECTION

PATENT NO. : 7,127,926 B1
APPLICATION NO. : 09/956745
DATED : October 31, 2006
INVENTOR(S) : J. A. Hermanson It is certified that error appears in the above-identified patent and that said Letters Patent is hereby corrected as shown below:

| COLUMN | LINE | ERROR |
|---|---|---|
| 15 (Claim 16, | 23 line 2) | delete "p1" |
| 15 (Claim 16, | 23 line 2) | indent the clause beginning "(a) diametrically cutting...;" |

Signed and Sealed this
Tenth Day of May, 2011

David J. Kappos
*Director of the United States Patent and Trademark Office*